United States Patent
Nader et al.

(10) Patent No.: US 11,502,736 B2
(45) Date of Patent: Nov. 15, 2022

(54) ADAPTIVE BEAM SELECTION IN A WIRELESS COMMUNICATION SYSTEM

(71) Applicant: Telefonaktiebolaget LM Ericsson (publ), Stockholm (SE)

(72) Inventors: Ali Nader, Malmö (SE); Béla Rathonyi, Lomma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 73 days.

(21) Appl. No.: 17/073,549

(22) Filed: Oct. 19, 2020

(65) Prior Publication Data
US 2021/0036758 A1    Feb. 4, 2021

Related U.S. Application Data

(62) Division of application No. 16/075,713, filed as application No. PCT/SE2017/050140 on Feb. 15, 2017, now Pat. No. 10,837,380.
(Continued)

(51) Int. Cl.
*H04B 7/06* (2006.01)
*H04W 16/28* (2009.01)
(Continued)

(52) U.S. Cl.
CPC .......... *H04B 7/0695* (2013.01); *H04B 7/063* (2013.01); *H04B 7/0617* (2013.01); *H04W 4/80* (2018.02);
(Continued)

(58) Field of Classification Search
CPC .... H04B 7/0695; H04B 7/0617; H04B 7/063; H04B 7/0413; H04W 4/80; H04W 16/28; H04W 72/046
See application file for complete search history.

(56) References Cited

U.S. PATENT DOCUMENTS 7,130,663 B2    10/2006 Guo
2013/0217404 A1    8/2013 Jung
(Continued)

FOREIGN PATENT DOCUMENTS

WO    2009008789 A1    1/2009
WO    2015080645 A1    6/2015
(Continued)

OTHER PUBLICATIONS

Hansen, C. et al., "NT-11 Beamforming Introduction", Submission, doc.: IEEE 802.11-10/0430r1, May 1, 2010, pp. 1-24, IEEE, obtained on Jul. 18, 2018, obtained online: https://mentor.ieee.org/802.11/dcn/10/11-10-0430-01-00adnt-11. pp. t.
(Continued)

*Primary Examiner* — Eric Myers
(74) *Attorney, Agent, or Firm* — Sage Patent Group

(57) ABSTRACT

A method implemented by a user equipment for adjusting a coverage enhancement (CE) level according to which the user equipment operates in a wireless communication system is presented. The method comprises determining a difference between a device-calculated CE level calculated by the user equipment and a network-derived CE level received from a radio network node. The method further comprises adjusting, by the difference, an updated device-calculated CE level calculated after the device-calculated CE level, to obtain an adjusted CE level and operating according to the adjusted CE level.

9 Claims, 13 Drawing Sheets

Related U.S. Application Data

(60) Provisional application No. 62/295,203, filed on Feb. 15, 2016.

(51) Int. Cl.
  *H04W 72/04* (2009.01)
  *H04W 4/80* (2018.01)
  *H04B 7/0413* (2017.01)

(52) U.S. Cl.
  CPC ......... *H04W 16/28* (2013.01); *H04W 72/046* (2013.01); *H04B 7/0413* (2013.01)

(56) References Cited

U.S. PATENT DOCUMENTS

| | | |
|---|---|---|
| 2013/0258885 A1 | 10/2013 | Yu et al. |
| 2014/0128109 A1 | 5/2014 | Li et al. |
| 2014/0177607 A1 | 6/2014 | Li et al. |
| 2015/0003338 A1 | 1/2015 | Xue et al. |
| 2015/0049824 A1 | 2/2015 | Kim et al. |
| 2016/0165583 A1 | 6/2016 | Ho et al. |
| 2016/0242159 A1 | 8/2016 | Ho et al. |
| 2017/0026962 A1 | 1/2017 | Liu et al. |
| 2017/0070991 A1 | 3/2017 | Subramanian et al. |
| 2017/0111886 A1 | 4/2017 | Kim et al. |
| 2017/0201361 A1 | 7/2017 | Xu et al. |
| 2017/0201393 A1 | 7/2017 | Gaal et al. |
| 2017/0339718 A1 | 11/2017 | Liu et al. |
| 2018/0139784 A1 | 5/2018 | Ryoo et al. |
| 2019/0028923 A1* | 1/2019 | Futaki .................. H04W 24/02 |
| 2019/0104549 A1 | 4/2019 | Deng et al. |

FOREIGN PATENT DOCUMENTS

| | | |
|---|---|---|
| WO | 2015090032 A1 | 6/2015 |
| WO | 2015116732 A1 | 8/2015 |
| WO | 2015139329 A1 | 9/2015 |
| WO | 2015147717 A1 | 10/2015 |

OTHER PUBLICATIONS

Extended European Search Report for European Patent Application No. EP 17753578.8 dated Aug. 26, 2019, 6 pages.

First Examination Report dated Jul. 9, 2020 for Indian Patent Application No. 201837028168, 6 pages.

* cited by examiner

ADAPTIVE BEAM SELECTION IN A WIRELESS COMMUNICATION SYSTEM

CROSS-REFERENCE TO RELATED APPLICATIONS

The present application is a divisional of U.S. patent application Ser. No. 16/075,713, filed on Aug. 6, 2018, which is a National phase of International Application PCT/SE2017/050140 filed Feb. 15, 2017, which claims priority from U.S. Provisional Application 62/295,203, filed Feb. 15, 2016, the disclosures of which are incorporated by reference herein.

TECHNICAL FIELD

The present application generally relates to a wireless communication system, and particularly relates to adaptive beam selection in a wireless communication system.

BACKGROUND

The $3^{rd}$ generation partnership project (3GPP) is standardizing a feature called Narrowband Internet of Things (NB-IoT) for satisfying the requirements of Machine Type Communication (MTC) applications, while maintaining backward compatibility with the current LTE radio access technology. Communication of control information and payload data in a NB-IoT environment proves challenging because it may be necessary for NB-IoT devices to operate in environments that exhibit very low signal to noise ratios (SNRs) while being unable to leverage existing LTE techniques for signal quality improvement given the large attendant frequency bandwidth and processing power demands.

For instance, although traditional LTE beamforming operations could theoretically improve signal quality in an NB-IoT system through greater antenna gain and signal power levels, the hefty feedback signaling load and signal processing required to implement these existing beamforming techniques would overwhelm an NB-IoT system. Thus, although techniques exist for improving signal quality in some existing wireless communication systems, these techniques require processing capability, device power availability, and system bandwidth at levels that low cost and/or low complexity systems such as NB-IoT systems are unable to provide.

SUMMARY

One or more embodiments herein adaptively select a beam for downlink signal transmission to a user equipment, based on a radio resource over which a response to one of multiple previously transmitted beam selection signals is received at a radio network node. Each of these multiple beam selection signals is initially transmitted by the radio network node over a different beam and, if received by the user equipment, prompts the user equipment to transmit a response over a particular radio resource. As a result, if it receives a response over a particular radio resource, a radio network node can conclude that the user equipment is able to receive downlink signals transmitted over the beam that previously transmitted a beam selection signal associated with the particular radio resource. Accordingly, the radio network node selects the beam to transmit downlink signals to the user equipment. In some embodiments, this adaptive beam selection approach may improve signal quality in low cost and/or low complexity systems (e.g., NB-IoT systems) that require limited radio resource and device processing power levels relative to existing LTE solutions.

In some embodiments, the different uplink radio resources are different time resources. For instance, in one or more embodiments, the beam selection signals are transmitted over the different beams in the form of paging signals during different paging occasions. In these embodiments, when the radio network node receives a response at a time after the beam selection signal is transmitted but before a next beam selection signal is scheduled for transmission, the radio network node may select the beam over which the beam selection signal was transmitted.

In other embodiments, the different uplink radio resources are different time-frequency resources. In one or more embodiments, for example, each beam selection signal transmitted over the different beams may include an uplink grant for an indicated time-frequency radio resource. Accordingly, each of the different beam selection signals prompts the user equipment to transmit a response over the particular time-frequency radio resource included in its uplink grant. In these examples, when the radio network node receives a response over a time-frequency radio resource associated with a beam selection signal transmitted over a particular beam, the radio network node may select this particular beam for subsequent downlink signal transmission to the user equipment.

In particular, the present disclosure describes an example method implemented by a radio network node for downlink signal transmission to a user equipment over an adaptively selected beam. In some examples, the method may include transmitting, over different beams, different beam selection signals that are respectively configured to prompt a response from the user equipment on different uplink radio resources. In addition, the method may include receiving, from the user equipment, a response over a responsive radio resource of the uplink radio resources and selecting, from the different beams, a beam over which was transmitted a beam selection signal configured to prompt a response on the responsive uplink radio resource. Furthermore, the method may include transmitting a downlink signal to the user equipment over the selected beam.

In some embodiments, the different beam selection signals comprise paging signals transmitted to the user equipment in different paging occasions.

Alternatively, or additionally, the different uplink radio resources in some embodiments comprise different time resources on a random access channel.

In other embodiments, the different beam selection signals comprise uplink grants that assign the user equipment the different uplink radio resources for uplink transmission.

Alternatively, or additionally, the different uplink radio resources may comprise different dedicated radio resources on an uplink data channel that is shared by multiple user equipments.

In any of the embodiments, the uplink radio resources may each comprise a time resource, a frequency resource, or a time-frequency resource. In some embodiments, the method further comprises determining one or more transmission parameters for transmission of the downlink signal based on said selecting, and transmitting the downlink signal using the one or more transmission parameters. In one embodiment, for example, the one or more transmission parameters are determined based on a beamforming gain realizable with the selected beam. Alternatively, or additionally, the downlink signal may convey a data block, and the one or more transmission parameters may include a number of repetitions of the data block to transmit. In some embodiments, the one or more transmission parameters include a modulation and coding scheme.

In some embodiments, the method may further comprise transmitting over one of the different beams a beam selection signal configured to prompt a response from the user equipment on the same uplink radio resource as another beam selection signal transmitted over a different beam, and wherein said receiving comprises receiving multiple responses over the responsive radio resource; said selecting comprises selecting multiple beams over which was transmitted a beam selection signal configured to prompt a response on the responsive uplink radio resource; and said transmitting comprises transmitting the downlink signal to the device over the selected multiple beams simultaneously.

In some embodiments, the method may further comprise, prior to transmitting the beam selection signals, selecting from multiple candidate sets of beams the candidate set that includes the different beams, by: transmitting, over the different candidate sets of beams, different set selection signals that are respectively configured to prompt a response from the user equipment on different uplink radio resources, wherein the same set selection signal is transmitted over each beam in any given candidate set of beams; receiving, from the user equipment, a response over a responsive radio resource of the uplink radio resources; and selecting, from the different candidate sets of beams, a candidate set over which was transmitted a set selection signal configured to prompt a response on the responsive uplink radio resource. In one embodiment, for example, the different candidate sets of beams each comprise non-overlapping beams, wherein the different beams comprise non-overlapping beams within the same candidate set. Alternatively or additionally, the method may further comprise determining a number of beams in each candidate set based on a performance capability of the radio network node, a load on the wireless communication system, a level of interference in the wireless communication system, and/or available resources in the wireless communication system.

In some embodiments, the method may further comprise, prior to transmitting the beam selection signals: transmitting, over different coarse beams, different coarse-beam selection signals that are respectively configured to prompt a response from the user equipment on different uplink radio resources; receiving, from the user equipment, a response over a responsive radio resource of the uplink radio resources; selecting, from the different coarse beams, a coarse beam over which was transmitted a coarse-beam selection signal configured to prompt a response on the responsive uplink radio resource; and selecting the different beams as different fine beams within a beam footprint of the selected coarse beam.

In some embodiments, the method may further comprise, prior to transmitting the beam selection signals: transmitting, over different non-overlapping beams, different non-overlapping beam selection signals that are respectively configured to prompt a response from the user equipment on different uplink radio resources; receiving, from the user equipment, a response over a responsive radio resource of the uplink radio resources; selecting, from the different non-overlapping beams, a non-overlapping beam over which was transmitted a non-overlapping-beam selection signal configured to prompt a response on the responsive uplink radio resource; and selecting the different beams as different overlapping beams that each overlap with at least one other of the different beams and with a beam footprint of the selected non-overlapping beam; wherein selecting from the different beams is further based on uplink measurements by the user equipment.

In still other embodiments, the method may further comprise identifying the different beams and/or the different uplink radio resources based on one or more of a performance capability of the radio network node, a current or past load on the wireless communication system, a level of interference in the wireless communication system, available resources in the wireless communication system, a positioning granularity level targeted by the radio network node, or a number of beams corresponding to the multiple beams.

In any of the above embodiments, the method may further comprise determining that the user equipment is stationary to at least a threshold extent, that the user equipment is within radio coverage deemed poor, and/or that the user equipment's system resource consumption is deemed large; and performing aspects of the embodiments of any of the embodiments based on said determining. In one embodiment, for instance, it may be determined that the user equipment is stationary to at least a threshold extent by: determining that the user equipment has been associated with a cell associated with the radio network node for at least a threshold time period; determining that a range of a set of transmission power values utilized by the user equipment in the cell during the threshold time period is less than a threshold power value; or determining that a range of a set of timing advance values utilized by the user equipment during the threshold time period is less than a threshold time value.

In any of the above embodiments, the method may further comprise estimating a location of the user equipment based on the selected beam.

In any of the above embodiments, transmitting the different beam selection signals may comprise transmitting the different beam selection signals over the different beams in a randomly ordered sequence.

Also, in any of the above embodiments, the downlink signal may comprise a narrowband Internet of Things (NB-IoT) signal.

In addition, the present disclosure describes a radio network node for downlink signal transmission to a user equipment over an adaptively selected beam. In an aspect, the radio network node may be configured to transmit, over different beams, different beam selection signals that are respectively configured to prompt a response from the user equipment on different uplink radio resources and to receive, from the user equipment, a response over a responsive radio resource of the uplink radio resources. In addition, the radio network node may be configured to select, from the different beams, a beam over which was transmitted a beam selection signal configured to prompt a response on the responsive uplink radio resource and transmit a downlink signal to the user equipment over the selected beam.

Also, the present disclosure describes a radio network node for downlink signal transmission to a user equipment over an adaptively selected beam. In an aspect, the radio network node may comprise a transmitting module for transmitting, over different beams, different beam selection signals that are respectively configured to prompt a response from the user equipment on different uplink radio resources. The radio network node may further comprise a receiving module for receiving, from the user equipment, a response over a responsive radio resource of the uplink radio resources. In addition, the radio network node may comprise a beam selection module for selecting, from the different beams, a beam over which was transmitted a beam selection signal configured to prompt a response on the responsive uplink radio resource. The transmitting module may also be for transmitting a downlink signal to the user equipment over the selected beam.

In addition, the present disclosure describes a method implemented by a user equipment for adjusting a coverage enhancement (CE) level according to which the device operates in a wireless communication system. In some examples, the method may include determining a difference between a device-calculated CE level calculated by the user equipment and a network-derived CE level received from a radio network node. The method may also include adjusting, by the difference, an updated device-calculated CE level calculated after the device-calculated CE level, to obtain an adjusted CE level. The method may further include operating according to the adjusted CE level.

In some embodiments, the method further comprises adjusting any updated device-calculated CE level by the difference, until an updated network-derived CE level or a contrary instruction is received from the radio network node.

Alternatively or additionally, the method may further comprise receiving the network-derived CE level when the user equipment is in a certain geographical area or cell, and adjusting any updated device-calculated CE level by the difference, until the user equipment moves from said certain geographical area or cell.

In some embodiments, the device-calculated CE level and any updated device-calculated CE level is calculated based on measuring one or more radio signals that are not beamformed by the radio network node.

The present disclosure also describes a user equipment for adjusting a coverage enhancement (CE) level according to which the device operates in a wireless communication system. In some examples, the user equipment is configured to determine a difference between a device-calculated CE level calculated by the user equipment and a network-derived CE level received from a radio network node. The user equipment may also be configured to adjust, by the difference, an updated device-calculated CE level calculated after the device-calculated CE level, to obtain an adjusted CE level, and to operate according to the adjusted CE level.

The present disclosure further describes a user equipment for adjusting a coverage enhancement (CE) level according to which the device operates in a wireless communication system. In some examples, the user equipment includes a determining module for determining a difference between a device-calculated CE level calculated by the user equipment and a network-derived CE level received from a radio network node. The user equipment may also include an adjusting module for adjusting, by the difference, an updated device-calculated CE level calculated after the device-calculated CE level, to obtain an adjusted CE level, and an operating module for operating the user equipment according to the adjusted CE level.

DETAILED DESCRIPTION

Figure 1:
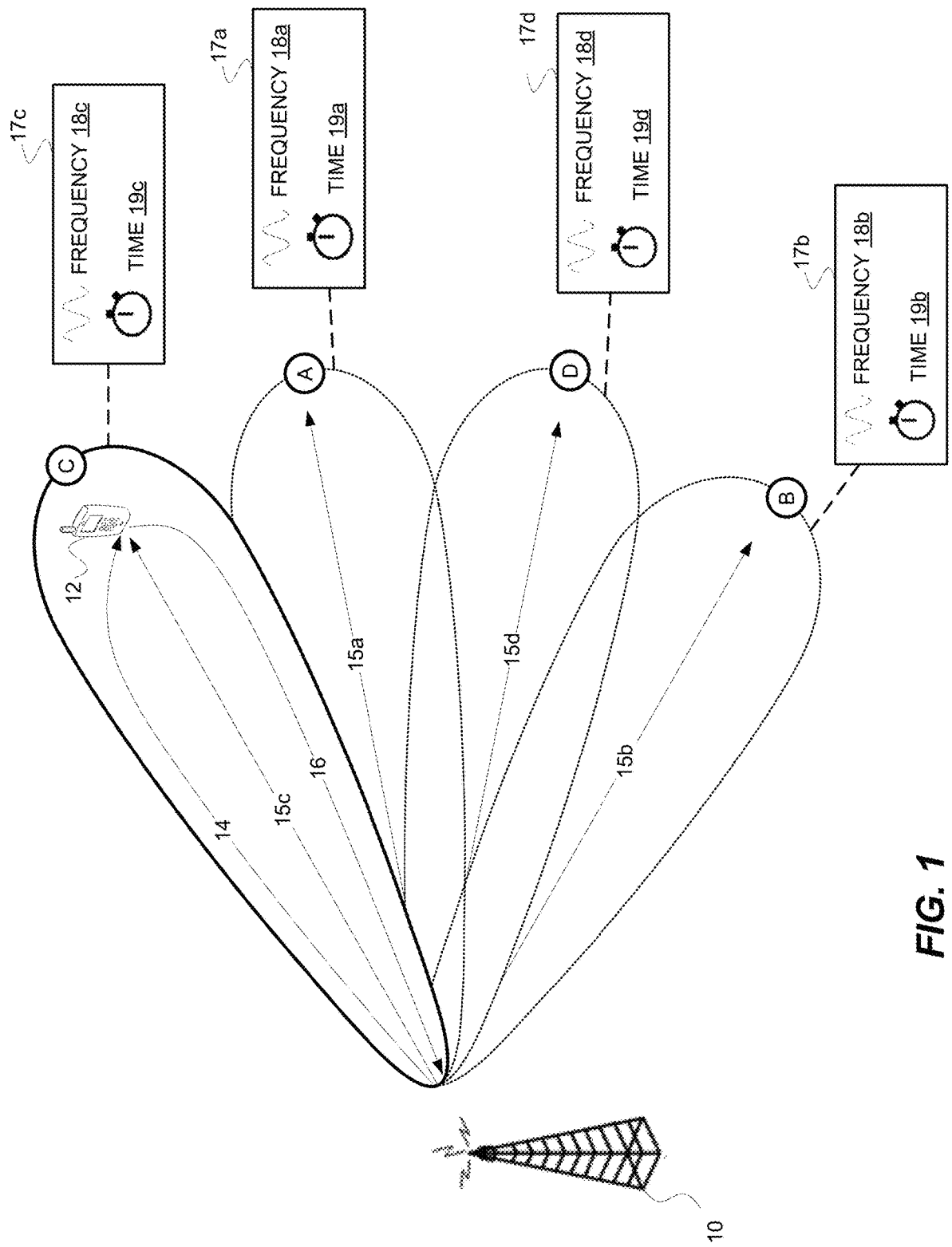
FIG. 1 is a block diagram of a wireless communication system according to one or more embodiments.

FIG. 1 illustrates a radio network node 10 and wireless communication device 12 (e.g., a user equipment, UE) in a wireless communication system (e.g., a narrowband Internet of Things, NB-IoT, system) according to one or more embodiments. The radio network node 10 is configured to perform downlink signal transmission over different possible beams A-D. From these different beams A-D, the radio network node 10 adaptively selects a beam for downlink signal transmission to the wireless communication device 12.

To this end, the radio network node 10 initially transmits different beam selection signals over the different beams A-D. As shown, for example, the radio network node 10 transmits (e.g., either sequentially or contemporaneously) beam selection signal 15a over beam A, beam selection signal 15b over beam B, beam selection signal 15c over beam C, and beam selection signal 15d over beam D (collectively, beam selection signals 15).

These beam selection signals 15 are respectively configured to prompt a response from the wireless communication device 12 on different uplink radio resources. In particular, beam selection signal 15a is configured to prompt a response on uplink radio resource 17a, beam selection signal 15b is configured to prompt a response on uplink radio resource 17b, beam selection signal 15c is configured to prompt a response on uplink radio resource 17c, and beam selection signal 15d is configured to prompt a response on uplink radio resource 17d (with the resources 17a-17d collectively referred to as uplink radio resources 17). These uplink radio resources 17a-17d may for instance be frequency resources 18a-d, time resources 19a-19d, or a combination thereof. They may be unique so as not to collide with other expected transmissions. No matter the specific type of uplink radio resources 17, though, a beam selection signal 15 in some embodiments explicitly specifies on which uplink radio resource 17 the device 12 is to transmit a response to that signal 15. In other embodiments, it may be predetermined or otherwise deterministic on which uplink radio resource 17 the device 12 is to transmit a response to any given beam selection signal 15, at least in a general sense (e.g., there may be a deterministic range of possible uplink radio resources on which the response may be transmitted)

In any event, upon transmitting at least one of the beam selection signals 15, the radio network node 10 receives a response 16 from the wireless communication device 12 over at least one of the uplink radio resources 17. An uplink radio resource over which a response is received is referred to for convenience as a "responsive" radio resource. FIG. 1 shows resource 17c as being a responsive radio resource since the radio network node 12 receives a response 16 over that resource 17c.

The radio network node 10 exploits this response 16 from the device 12 in order to adaptively select a beam over which to transmit to the device 12, e.g., according to an initial beam selection approach. Specifically, the radio network node 10 selects, from the different beams A-D, a beam over which was transmitted a beam selection signal configured to prompt the response 16 on the responsive uplink radio resource 17c. For example, the radio network node 10 may identify the responsive uplink radio resource 17c over which the response was received and determine whether this responsive radio resource 17c matches a radio resource over which a beam selection signal 15 was configured to prompt a response in the uplink. In FIG. 1's example, the radio network node 10 selects beam C because that is the beam over which beam selection signal 15c was transmitted. And beam selection signal 15c was the signal that prompted the response 16 on the responsive radio resource 17c. In other words, selected beam C corresponds to the radio resource 17c over which the response 16 was received.

Having performed beam selection in this way, the radio network node 10 subsequently transmits a downlink signal 14 to the wireless communication device 12 over the selected beam C. The downlink signal 14 may for instance convey "user" data (e.g., over a Physical Downlink Shared Channel, PDSCH), control data (e.g., over a Physical Downlink Control Channel, PDCCH), a reference signal, or any other kind of information. Regardless, the radio network node 10 in some embodiments transmits this downlink signal 14 based on an assumption that the device 12 is able to receive the downlink signal 14 over the selected beam C, since the device 12 previously responded to a transmission on that beam C.

In some embodiments, the beam selection signals 15 function not only for adaptive beam selection, but also for another purpose. That is, the beam selection signals 15 serve a dual purpose, rather than being dedicated exclusively for adaptive beam selection. In fact, in one or more embodiments, the beam selection signals 15 are each a type of signal (e.g., a paging signal or an uplink grant) that the radio network node 10 or some other node decides to transmit to the wireless communication device 12 irrespective of adaptive beam selection herein (e.g., as a necessary part of transmitting the downlink signal 14 to the device 12 or receiving an uplink signal from the device). Upon the decision to transmit that type of signal, though, the radio network node 10 seizes an opportunity to perform adaptive beam selection by transmitting the type of signal as different beam selection signals 15 over the different beams A-D.

No matter the particular decision timeline, though, transmitting the beam selection signals 15 as dual-purpose signals advantageously avoids or at least minimizes the signalling overhead contribution of adaptive beam selection. Indeed, in some embodiments, the signalling overhead would have occurred to some extent anyway, even without adaptive beam selection. This overhead savings proves particularly advantageous in systems such as NB-IoT with especially scarce radio resources.

Figure 2:
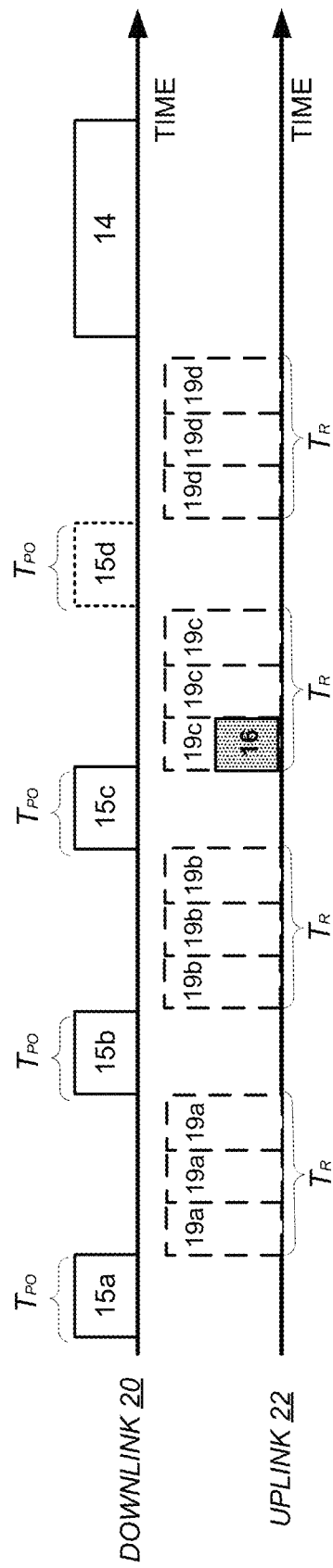
FIG. 2 is a block diagram of downlink and uplink transmissions over time, with reference to FIG. 1, according to one or more embodiments.

FIG. 2 in this regard illustrates some embodiments where the different beam selection signals 15 are paging signals. This type of signal may for instance be transmitted to the device 12 when the device 12 is in idle mode, as a necessary prerequisite to transmitting the downlink signal 14 irrespective of adaptive beam selection. In such a case, transmission of the beam selection signals 15 adds little, if any, additional signalling overhead.

Regardless, the beam selection signals 15 in the form of paging signals are transmitted to the device 12 in different paging occasions, e.g., of time duration $T_{PO}$ in the downlink 20. These paging occasions may be successive occasions in a predefined series of paging occasions that occur periodically in time, e.g., paging subframes in LTE. With the paging signals 15a-15d transmitted in different paging occasions, the paging signals are configured to prompt the device 12 to transmit a response on different time resources 19a-19d in the uplink 22, e.g., over a random access channel. These different time resources 19a-19d may be predetermined or otherwise deterministic in at least a general sense. For example, as shown in FIG. 2, paging signal 15a is configured to prompt a response on any of the time resources 19a (e.g., uplink subframes) within a possible response time duration $T_R$ occurring after transmission of that paging signal 15a. Likewise, paging signals 19b-d are configured to prompt a response on any of the time resources 19b-d within a possible response time duration $T_R$ occurring after transmission of those paging signals 15b-d, respectively. Accordingly, the radio network node 10 monitors for a response on any of these possibly responsive uplink radio resources, in an effort to ultimately identify which of the beams A-D was heard by the device 12.

As shown in FIG. 2, for example, the radio network node 10 initially transmits a beam selection signal 15a to the wireless communication device 12 over beam A. After determining that a response to the beam selection signal 15a has not been received on any of the uplink radio resources 19a during a subsequent receiving time period $T_R$ (e.g., because the device 12 was not reachable over beam A), the radio network node 10 then transmits a next beam selection signal 15b to the wireless communication device 12 over beam B. Again, the radio network node 10 does not receive a response during a receiving time period $T_R$ associated with beam selection signal 15b. As such, after waiting this receiving time period, the radio network node 10 transmits beam selection signal 15c to the wireless communication device 12 over beam C. This time, the wireless communication device 12 transmits a response 16 that is received by the radio network node 10 on one of the uplink radio resources 19c during receiving time period $T_R$. As a result, the radio network node 10 selects beam C as a beam over which it will transmit a subsequent downlink signal 14 to wireless communication device 12.

In some embodiments, the radio network node 10 selects beam C as the only beam over which it transmits the downlink signal 14. In such a case, the radio network node 10 may refrain from transmitting any further beam selection signals once any beam is selected. In other embodiments, however, as indicated by the dotted line of beam selection signal 15d associated with beam D, the radio network node 10 may proceed with further beam selection signal transmissions even after one beam has been selected, e.g., in order to select additional beams over which to transmit the downlink signal 14.

Furthermore, in an aspect, the embodiment of FIG. 2 may be performed when the wireless communication device 12 does not have an established Radio Resource Control (RRC) connection with the radio network node 10 and is therefore in an RRC idle mode. In such examples (and in some examples where the wireless communication device is in RRC connected mode), the timing of the different paging occasions during which the beam selection signals 15 are sequentially transmitted may be defined according to a discontinuous reception (DRX) cycle length of the device 12. This DRX cycle length may be communicated to the wireless communication device 12, for instance, in a system information block (SIB) message (e.g., the SIB2 message). In these examples, if a wireless communication device 12 receives the beam selection signal 15 as a paging signal in a particular paging occasion (during which the wireless communication device 12 tunes to a downlink channel (e.g., E-PDCCH or NB-PDCCH)), the response 16 transmitted by the wireless communication device 12 may be an RRC connection request message transmitted to the radio network node 10 over a common uplink control channel or data channel (e.g., a random access channel (RACH) or PUSCH). Generally, the uplink radio resources 17 described herein may be radio resources on an uplink control channel or an uplink data channel that is shared by multiple wireless communication devices 12.

Figure 3A:
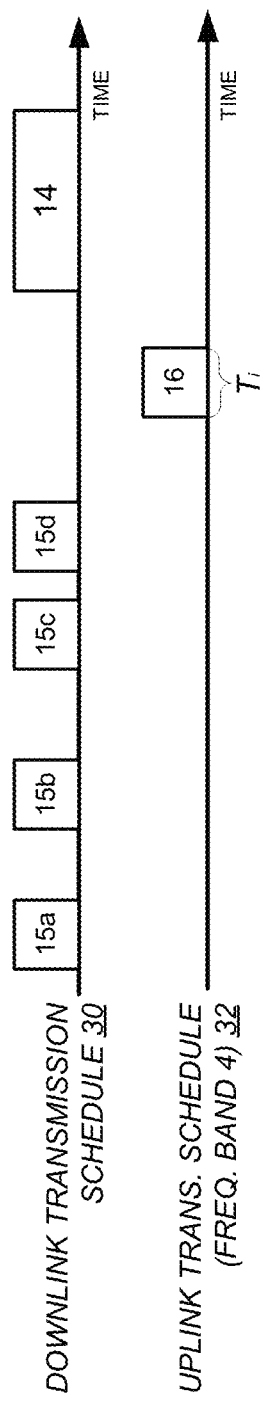
FIG. 3A is a block diagram of downlink and uplink transmissions over time, with reference to FIG. 1, according to one or more embodiments.
Figure 3B:
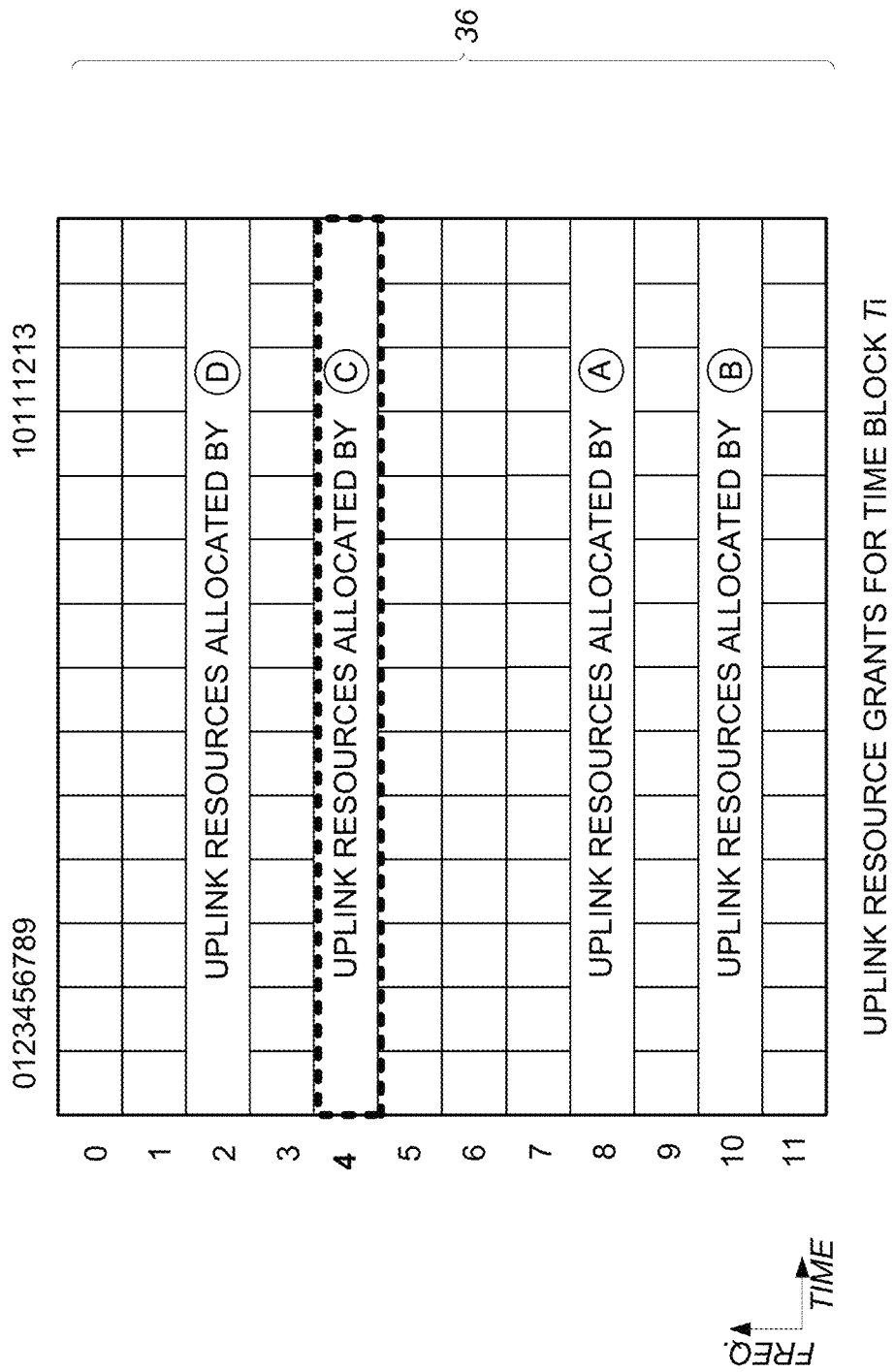
FIG. 3B is a block diagram of a time-frequency block in which uplink resources are allocated according to one or more embodiments.
Figure 4:
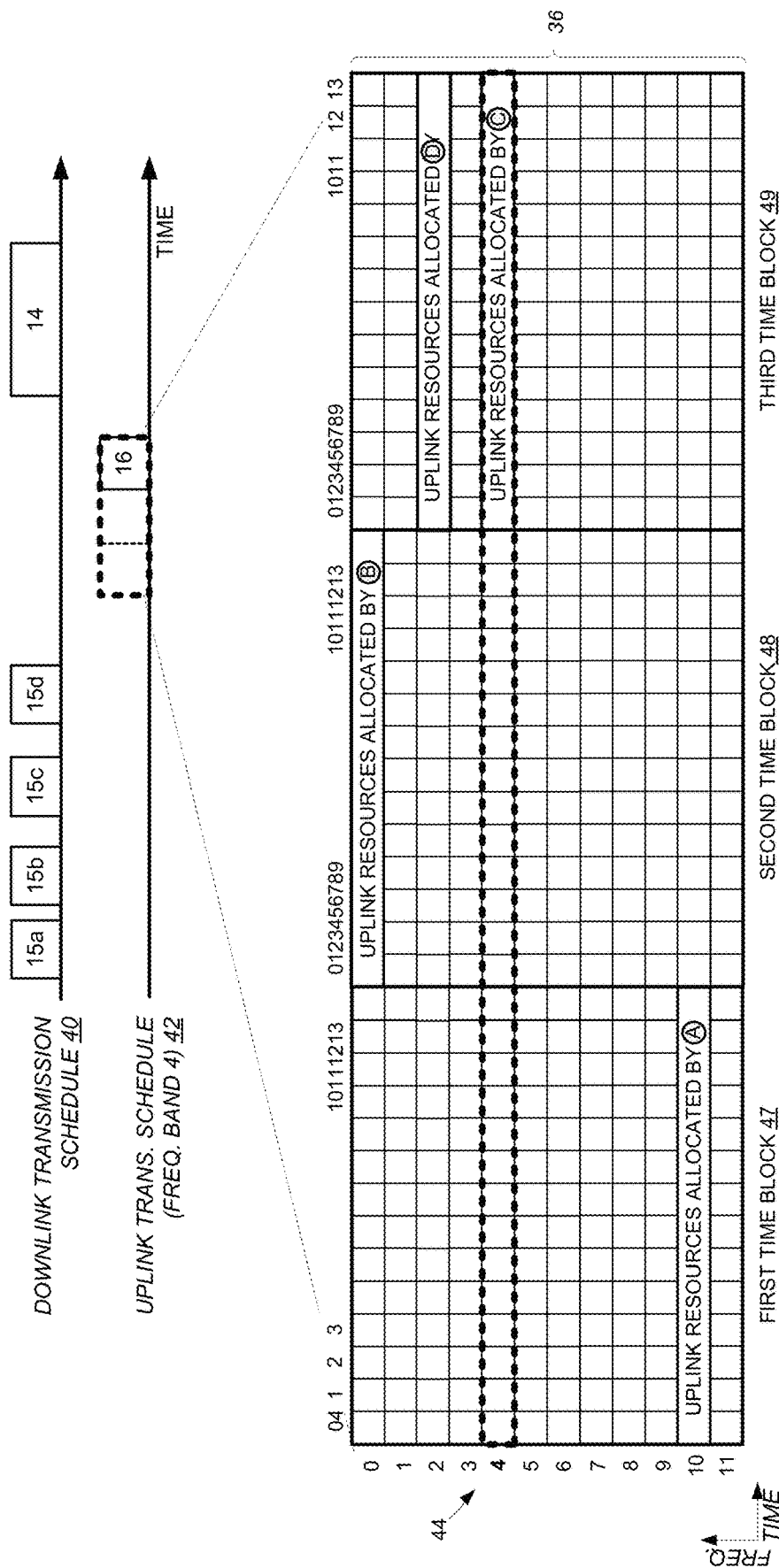
FIG. 4 is a block diagram of downlink and uplink transmissions over time, with reference to FIG. 1, as well as of time-frequency blocks in which uplink resources are allocated according to one or more embodiments.

Thus, as introduced above and as described in reference to FIG. 2, the radio resource over which a response is received may be a time at which the response is transmitted over an uplink channel, which may occupy an entire available frequency bandwidth in some systems such as NB-IoT. In additional or alternative example embodiments, however, the radio resource over which the response is received may involve a frequency component in addition to a time-specific radio resource. FIGS. 3A-B and 4 illustrate such embodiments in a context where a beam selection signal 15 instead serves the dual purpose of an uplink grant for the device 12. Particularly, in the example implementation of FIGS. 3A-B and 4, each of the beam selection signals 15 transmitted over the different beams A-D are uplink grants that assign the wireless communication device 12 different uplink radio resources (e.g., a different time and/or frequency) for uplink transmission of the response 16. In this way, each beam selection signal 15 explicitly indicates an uplink radio resource on which the device 12 is to transmit a response to that signal 15. For example, the different radio resources 17 indicated in the different beam selection signals 15 may be different dedicated time-frequency resources on an uplink data channel that is shared by multiple wireless communication devices 12.

FIGS. 3A-3B illustrate such an implementation with reference to the downlink transmission schedule 30, uplink transmission schedule 32, and the resource map 34, which refer to reference numbers in FIG. 1. The resource map 34 indicates the beam-specific time-frequency resource grants included in the different beam selection signals 15*a*, 15*b*, 15*c*, and 15*d* of FIG. 1, which, in some examples, may be downlink control information (DCI) messages. As illustrated in FIG. 3B, the resource map 34 shows an uplink resource allocation for the total available uplink frequency bandwidth 36 for the wireless communication system resources over a time block $T_i$, which may correspond to a 1 ms LTE subframe, a 10 ms LTE frame, or any other time block. The total available uplink frequency bandwidth 36 can be further divided into frequency bands, such as the twelve frequency bands 0-11 shown in the non-limiting implementation of FIG. 3B. In some non-limiting implementations, each of these frequency bands may correspond to a subcarrier of the total available frequency bandwidth 36. In addition, the time block $T_i$ can be divided into time slots, such as the fourteen time slots 0-13 shown in the non-limiting implementation of FIG. 3B. In some non-limiting examples, each of these time slots may correspond to a symbol (e.g., an OFDM symbol) of an LTE subframe.

As shown in the downlink transmission schedule 30 of FIG. 3A, beam selection signals 15*a*, 15*b*, 15*c*, and 15*d* are sequentially transmitted over beams A, B, C, and D, respectively. In some alternative embodiments, however, all or part of each of the beam selection signals 15*a*, 15*b*, 15*c*, and 15*d* may be transmitted simultaneously. Regardless of whether the beam selection signals 15 are transmitted sequentially or simultaneously, each of the different beam selection signals 15 may include an uplink frequency grant that grants a particular frequency band in the total uplink frequency bandwidth 36 to the wireless communication device 12 for an entire subsequent time block $T_i$. For instance, in the example embodiment of FIG. 3A-3B implementing sequential transmission of the beam selection signals 15, beam selection signal 15*a* may grant frequency band 8 to the wireless communication device 12 as shown in FIG. 3B, beam selection signal 15*b* may grant frequency band 10 to the wireless communication device 12, beam selection signal 15*c* may grant frequency band 4 to the wireless communication device 12, and beam selection signal 15*d* may grant frequency band 2 to the wireless communication device 12. After each of the beam selection signals 15 have been transmitted over beams A, B, C, and D, respectively, the radio network node 10 may observe each of the frequency bands granted in the beam selection signals 15 (or all frequency bands of the total available uplink frequency bandwidth 36) during time block $T_i$. If it receives a response 16 over any of these frequency bands, the radio network node 10 may be configured to select the one or more beams that carried a beam selection signal 15 that prompted a response 16 over these frequency bands.

For instance, as shown in the non-limiting implementation of FIG. 3B and highlighted by the bold dashed box around the frequency band 4, a response is transmitted in the uplink over only frequency band 4 during time block $T_i$ and is received by the radio network node 10. Accordingly, the radio network node 10 may determine that beam C carried the beam selection signal 15*c* that prompted the response 16 over frequency band 4 and may therefore select beam C as the beam to be utilized for subsequent transmission of downlink signal 14 to the wireless communication device 12.

Although each of the uplink resource grants included in each of the beam selection signals 15 of FIG. 3A-3B are directed to a particular frequency band in a single time block $T_i$, the uplink resource grants may also vary across different time blocks. FIG. 4 illustrates such an alternative example embodiment.

As shown in FIG. 4, uplink resources granted in the different beam selection signals 15*a*, 15*b*, 15*c*, and 15*d* may include time-frequency resources in different time blocks, namely a first time block 47, a second time block 48, and a third time block 49. These blocks 47-49 may for example be three consecutive subframes or frames in an implementation that adheres to some legacy LTE frame scheduling standards.

As shown in the downlink transmission schedule 40, like downlink transmission schedule 30 of FIG. 3A, beam selection signals 15a, 15b, 15c, and 15d are sequentially transmitted over beams A, B, C, and D, respectively. Beam selection signal 15a grants frequency band 10 of the first time block 47 to the wireless communication device 12, beam selection signal 15b grants frequency band 0 of the second time block 48 to the wireless communication device 12, beam selection signal 15c grants frequency band 4 of the third time block 49 to the wireless communication device 12, and beam selection signal 15d grants frequency band 2 of the third time block 49 to the wireless communication device 12. After each of the beam selection signals 15 have been transmitted over beams A, B, C, and D, respectively, the radio network node 10 observes each of the time-frequency resources granted in the beam selection signals 15 (or all frequency bands of the total available uplink frequency bandwidth 36) during the first, second, and third time blocks 47-49. If it receives a response 16 over any of these particular time-frequency resources, the radio network node 10 selects the one or more beams that carried a beam selection signal 15 that prompted a response 16 over the particular time-frequency resources (e.g., over the frequency bands and during the time block indicated in the different beam selection signals 15).

For instance, as shown in the non-limiting implementation of FIG. 4 and highlighted by the bold dashed box around the frequency band 4, a response is transmitted in the uplink over only frequency band 4 during third time block 49 (shown in uplink transmission schedule 42 for frequency band 4) and is received by the radio network node 10. Accordingly, the radio network node 10 may determine that beam C carried the beam selection signal 15c that prompted the response 16 over frequency band 4 and during the third time block 49. The radio network node 10 may therefore select beam C as the beam to be utilized for subsequent transmission of downlink signal 14 to the wireless communication device 12.

No matter the particular dual purpose served by the beam selection signals 15 (e.g., paging, uplink grant, etc.), transmitting the selection signals 15 as dual-purpose signals in at least some embodiments means that the wireless communication device 12 remains insulated from the notion that the radio network node 10 performs adaptive beam selection. The device 12 therefore need not implement any dedicated processing (e.g., protocols or feedback) or have dedicated hardware for adaptive beam selection or reception. For example, the device 12 need not knowingly feed back a certain beam direction or identity to the radio network node 10. Keeping the device 12 completely unaware of the adaptive beamforming techniques herein minimizes device complexity, cost, and/or power consumption e.g., consistent with NB-IoT objectives. Moreover, network-side complexity is also minimized as the radio network node 10 need simply identify a radio resource on which a response is received, e.g., as opposed to performing intense algorithms to determine angle of arrival.

Still further, the radio network node 10 in some embodiments dynamically adapts or otherwise determines one or more transmission parameters for transmission of the one or more downlink signals 14 based on the beam selection. For example, the radio network node 10 may capitalize on the beamforming gain realizable by this beam selection, in order to choose transmission parameter(s) that conserve system resources while still meeting reliability targets for downlink signal transmission to the device 12. Conserving system resources in turn increases system performance and/or capacity.

In a NB-IoT context, for instance, the downlink signal 14 may convey a number of repetitions a data block (e.g., a MAC PDU or transport block comprising 'user data' and/or control data). This repetition is costly in terms of system resources, interference generation, and device power consumption. Accordingly, the radio network node 10 in some embodiments performs beam selection herein in an effort to transmit as few repetitions to the device 12 as needed to meet reliability targets for the downlink signal transmission. The radio network node 10 thereby determines a number of repetitions to transmit based on the beam selection, e.g., so as to reduce those repetitions as compared to if beam selection were not performed. Of course, the radio network node 10 may determine one or more other transmission parameters instead of or in addition to the number of repetitions, e.g., in order to achieve the same or a similar goal in conserving system resources. These other transmission parameters may include for example a modulation and coding scheme (MCS), a transmission power level, a specific timing, and/or a coverage enhancement (CE) level.

In these and other embodiments, therefore, the radio network node 10 may selectively perform the beam selection approaches herein only for certain devices that pose a threat to system resources. These resource-threatening devices may include for instance those within radio coverage deemed poor and/or those whose system resource consumption is deemed large. The radio network node 10 in some embodiments identifies resource-threatening devices as including those whose transmissions have a low coding rate and/or those that require a high number of repetitions.

That said, the radio network node 10 in some embodiments additionally or alternatively conditions performance of beam selection for a device on that device being deemed stationary to at least a threshold extent. Accordingly, in some non-limiting example embodiments, a radio network node 10 may be configured to perform the beam selection and beam-specific downlink transmission techniques described above only where it is determined that the wireless communication device 12 is stationary. By first making a determination that the wireless communication device is stationary, the radio network node 10 may avoid effectively wasting the limited resources of the wireless communication system to select a position-specific beam tied to the location of the wireless communication device 12 when this particular location is changing or is likely to change. As such, before performing the above aspects related to specific beam selection, the radio network node 10 may first make a threshold determination that the wireless communication device 12 is stationary, or otherwise may not perform the beam selection aspects above.

In some examples, to determine whether the wireless communication device 12 is stationary, the radio network node 10 may be configured to determine that the wireless communication device has been associated with (e.g., camped on or engaging in communication with) a cell associated with the radio network node 10 for at least a threshold time period. Alternatively or additionally, this stationary determination may be made when a range of a set of transmission power values utilized by the wireless communication device in the cell during the threshold time period is less than a threshold power value (i.e., when the device 12 has used almost the same transmission power for some time). Furthermore, the stationary determination may alternatively or additionally be made when a range of a set of timing advance values utilized by the wireless communication device 12 during the threshold time period is less than a threshold time value (i.e., when the device 12 has used a similar timing advance value for some time).

In a further aspect of the present embodiments, the radio network node 10 may perform multiple "rounds" of the example embodiments described herein (e.g., those of FIGS. 2-4 and other examples) to iteratively increase precision and/or accuracy of an ultimately selected beam over which it will transmit downlink signals 14 to the particular wireless communication device 12. In this "multi-round" aspect, the radio network node 10 may effectively adjust the granularity of each successive "round" to be finer. The radio network node 10 may do so for instance by shrinking the beam footprint of each of the different beams used in each round and by tuning the shrunken beams on one or more beams selected in a previous round during which a group of different coarser beams were utilized.

Figure 5:
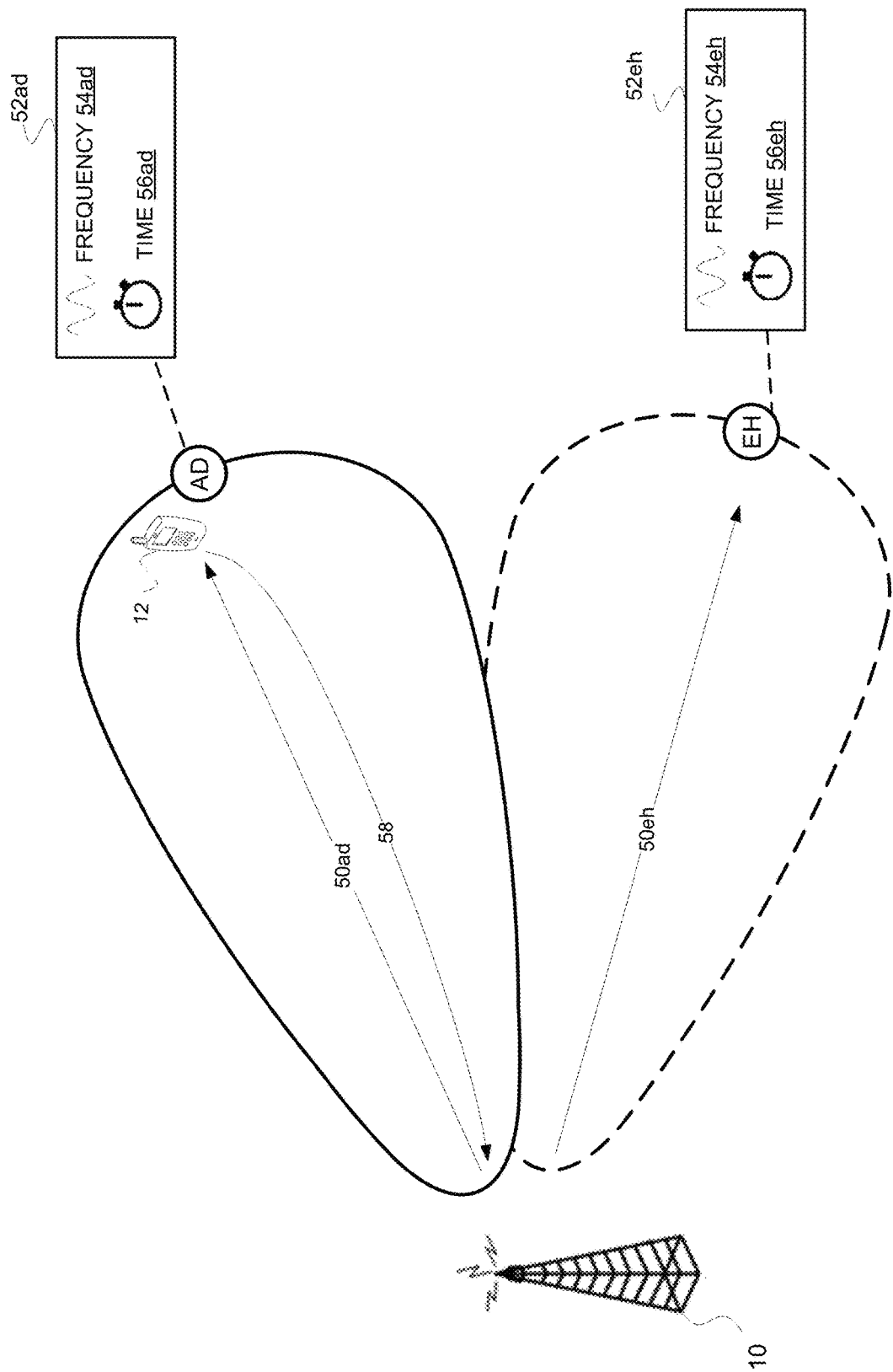
FIG. 5 is a block diagram of a wireless communication system according to one or more embodiments.

FIG. 5 illustrates one example. Prior to transmitting beam selection signals 15a-15d over the fine beams A-D shown in FIG. 1, the radio network node 10 in these embodiments first transmits coarse-beam selection signals 50ad and 50eh over coarse beams AD and EH, respectively. Coarse beam AD has a beam footprint that substantially encompasses fine beams A-D shown in FIG. 1, whereas coarse beam EH has a beam footprint directed towards other areas of the radio network node's coverage. The different coarse-beam selection signals 50ad and 50eh are respectively configured to prompt a response from the device 12 on different uplink radio resources 52ad and 52eh, in a way similar to that described for FIGS. 1-4. These resources 52ad and 52eh may again comprise frequency resources 54, time resources 56, or a combination thereof.

As shown, the radio network node 10 receives a response 58 from the device 12 on uplink radio resource 52ad. As a result, the radio network node 10 selects coarse beam AD from coarse beams AD and EH. This is because coarse beam AD was the beam over which was transmitted coarse-beam selection signal 50ad, which prompted the device 12 to respond on resource 52ad.

Having selected coarse beam AD, the radio network node 10 performs another iteration or round of beam selection, but at a finer granularity focused on the geographical footprint covered by beam AD. The node 10 in this example does so by selecting beams A-D shown in FIG. 1 as different fine beams within beam AD's geographical footprint. In other words, fine beams A-D may be tuned to a beam footprint area associated with a different, coarser (i.e., having a greater or wider beam footprint than the beams of the subsequent iteration or round) beam selected in a previous round.

As such, in the iterations or rounds of each of the embodiments of FIGS. 1-4, when the radio network node 10 chooses or configures the different beams A-D as beams that may eventually be selected for downlink signal transmission, it may be selecting the different beams A-D as different fine beams within a beam footprint of the selected coarse beam of a previous iteration or round. Thus, the radio network node 10 may be configured to narrow a beam width corresponding to each of the different beams utilized in the previous round and may train the narrowed beams, or "fine beams," A-D to transmit within a beam footprint corresponding to a subset of the different beams selected before narrowing the beam width of the different beams (i.e. within a beam footprint of one or more beams utilized in the previous round, which may correspond to the beams selected in the previous round). After narrowing the beams, the radio network node 10 may retransmit the different beam selection signals to the wireless communication device 12 over the different fine beams A-D. And in addition to the response received in the previous round the radio network node 10 may receive, in response to retransmitting the different beam selection signals over the fine beams, an additional response over an additional responsive uplink radio resource and at a reception power level. Based on one or both of the additional responsive uplink radio resource or the reception power level, the radio network node 10 may select an additional beam (i.e., a fine beam in addition to the previously selected coarse beam) of the multiple fine beams over which to transmit the downlink signal. Therefore, in an aspect of the embodiments, the radio network node 10 may be configured to repeat the narrowing, training, retransmitting, receiving, and selecting until a target level of precision regarding a location of the wireless communication device is achieved.

In at least some embodiments, the fine beams A-D are non-overlapping. In other embodiments, though, the fine beams A-D each overlap with at least one other of the beams A-D and with the beam footprint of their "encompassing" coarse beam AD that was selected in a previous iteration. In this latter case, therefore, the device 12 may transmit a response to multiple (e.g., all) beam selection signals 15, since they are encompassed with the previously selected coarse beam AD. The radio network node 10 therefore selects between the beams A-D based also on one or more other criteria, in addition to the presence of a response to a transmission over those beams. In some embodiments, the one or more other criteria include uplink measurements by the device 12. The node 10 may for instance select whichever of the beams A-D the device 12 measures as having the highest reception power level.

In this and other embodiments, therefore, the radio network node 10 may transmit, over different non-overlapping beams (e.g., beams AD and EH), different non-overlapping beam selection signals that are respectively configured to prompt a response from the wireless communication device on different uplink radio resources. The node 10 then receiving, from the wireless communication device, a response over a responsive radio resource of the uplink radio resources. The node 10 correspondingly selects, from the different non-overlapping beams, a non-overlapping beam (e.g., beam AD) over which was transmitted a non-overlapping-beam selection signal configured to prompt a response on the responsive uplink radio resource. As a result, the node 10 selects the different beams A-D as different overlapping beams that each overlap with at least one other of the different beams A-D and with a beam footprint of the selected non-overlapping beam. This selection may also be based on uplink measurements by the device 10.

Figure 6:
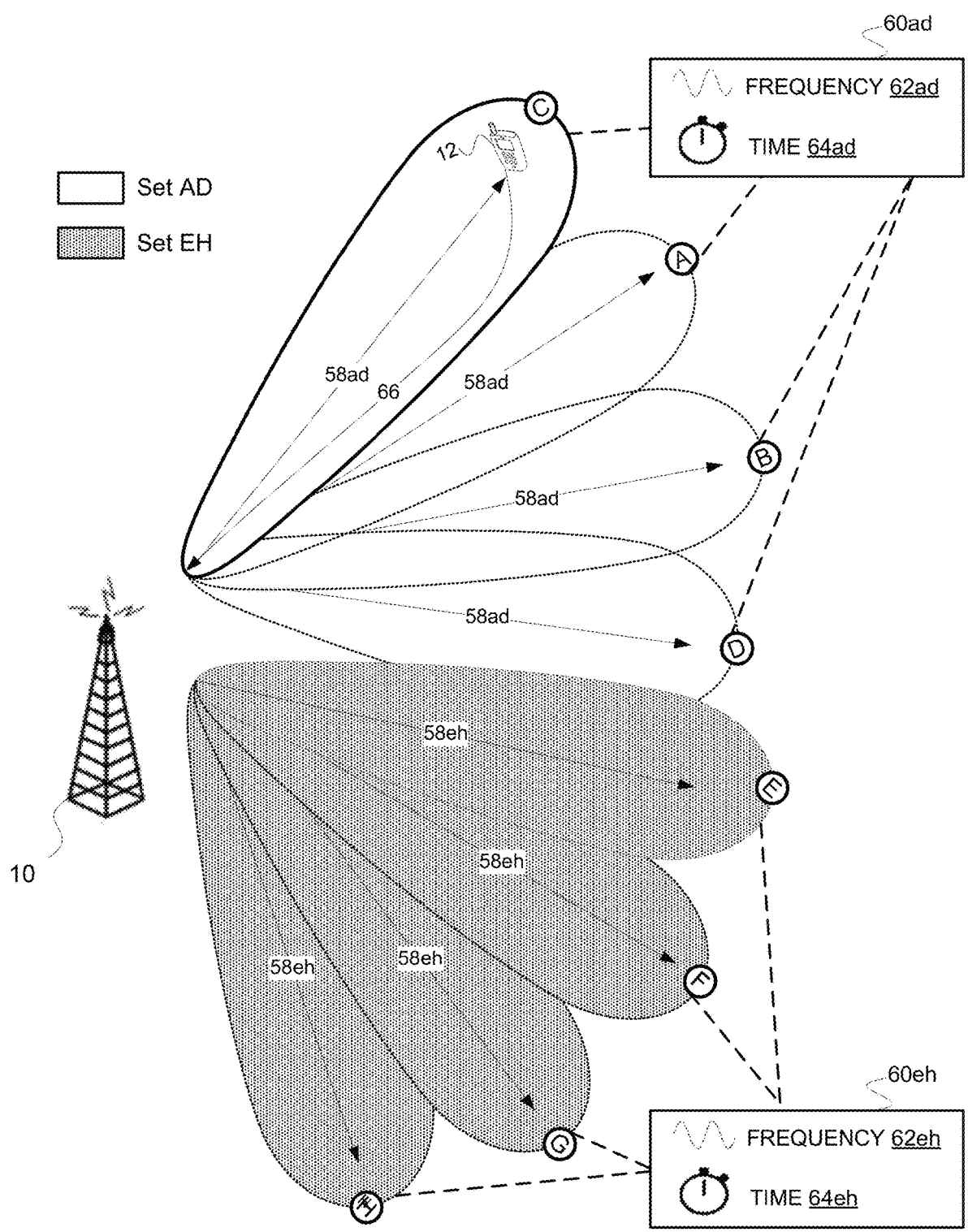
FIG. 6 is a block diagram of a wireless communication system according to one or more embodiments.

FIG. 6 illustrates still other embodiments herein where the radio network node 10 performs beam selection in different stages or iterations. In these embodiments, the radio network node 10 groups beams into two or more candidate sets of beams. As shown, for example, the radio network node 10 groups beams A-D into a candidate set AD and groups other beams E-H into a candidate set EH. The radio network node 10 transmits, over the different candidates sets AD and EH, different so-called set selection signals 58ad and 58eh that are respectively configured to prompt a response from the device 10 on different uplink radio resources 60ad and 60eh. Note that the same set selection signal is transmitted over each beam in any given candidate set. That is, set selection signal 58ad is transmitted over each of beams A-D, and set selection signal 58eh is transmitted over each of beams E-H.

Because of this, the set selection signals 58*ad* and 58*eh* exclusively facilitate beam selection on a set basis, not on an individual beam basis. Accordingly, when the radio network node 10 receives a response 66 from the device 12 over uplink radio resource 60*ad*, the node 10 can only deduce that the device 12 received the set selection signal 58*ad* over at least one of beams A-D; it cannot distinguish between the individual beams A-D in this regard. The node 10 therefore selects, from the candidate sets AD and EH, the candidate set AD over which was transmitted set selection signal 58*ad*, because it was configured to prompt a response 66 on the responsive uplink radio resource 60*ad*.

In at least some embodiments, the different candidate sets each comprise substantially non-overlapping beams. In this case, therefore, the different beams A-D may comprise substantially non-overlapping beams within the same candidate set AD. Note of course that although FIG. 6 shows the candidate sets as themselves being substantially non-overlapping, the sets in other embodiments overlap. For example, the candidate sets AD and EH may have beams that are interlaced or otherwise intermingled (e.g., one set may include beams B, D, F, and H, whereas another set includes beams A, C, E, and G).

Furthermore, note that the set selection signals 58*ad* and 58*eh* in some embodiments are transmitted simultaneously over each beam in the respective candidate sets AD and EH. For example, where the set selection signals 58*ad* and 58*eh* are themselves paging signals (similar to other embodiments), set selection signal 58*ad* may be transmitted simultaneously over beams A-D and set selection signal 58*eh* is subsequently transmitted simultaneously over beams E-H. Non-simultaneous transmission may be performed in other embodiments, though, such as in embodiments where transmission timing does not dictate on which uplink radio resource(s) a response is prompted.

In an aspect of this example implementation, the radio network node 10 may be further configured to determine a number of beams in each candidate set based on a performance capability of the radio network node, a load on the wireless communication system, a level of interference in the wireless communication system, and/or available resources in the wireless communication system. Moreover, the radio network node 10 may be configured to populate each of the different candidate sets of beams with non-overlapping beams, such that the different beams within a given candidate set are non-overlapping beams.

Note that, although in some examples herein beam or set selection signals are described as being transmitted in a certain order, any order of such signals (e.g., random) is contemplated by the present disclosure. Moreover, in some examples, two or more of the beam or set selection signals may be transmitted contemporaneously, at least where the uplink radio resources for a response are not exclusively dictated by the transmit timing of the selection signals.

In addition to the example embodiments presented above, therefore, other example embodiments that are not explicitly illustrated in the figures may be implemented according to the following additional or alternative techniques. For instance, in one example aspect, a beam selection signal 15 may be configured to prompt a response 16 from the wireless communication device 12 on the same uplink radio resource 17 as another beam selection signal 15 transmitted over a different beam. In such an example, the radio network node 10 may receive multiple responses over the responsive radio resource, and as a result, may select the multiple beams over which was transmitted the respective beam selection signals 15 configured to prompt a response on the responsive uplink radio resource. In this example scenario, these multiple selected beams may be utilized for the subsequent transmission of the downlink signal 14, such that the downlink signal 14 is transmitted to the device over the selected multiple beams simultaneously or sequentially.

For purposes of the present disclosure, non-overlapping beams may be beams that do not share any portion of (or a shared portion less than a threshold value or percentage of) their respective beam footprints. A beam footprint may be a two-dimensional geographical land area, or three-dimensional volume including both the geographical area and any volume above the geographical land area, inside of which the wireless communication device 12 is able to receive (or receive and successfully decode) transmissions over a beam.

Note that any of the above embodiments may also be combined, e.g., different embodiments may be used for different stages or iterations of beam selection.

Furthermore, the beam selection approach may be performed only selectively or periodically as deemed necessary; that is, it may not be performed for every downlink signal transmission. In fact, the radio network node 10 in some embodiments stores the result of beam selection and re-uses the same selected beam for one or more subsequent transmissions, especially if the device 12 is deemed to be stationary. For example, the first time the node 10 desires to page the device 12 the radio network node 10 may employ paging signals as beam selection signals in order to select a beam over which to transmit user data to the device 12. The next time the radio network node 10 desires to page the device 12, though, the radio network node 10 may initially transmit the paging signal over the previously selected beam in order to page the device 12. In this case, not only may the user data be transmitted over the selected beam, but also the initial page.

In an aspect of the present disclosure, the downlink signal 14 may include repetitions of a data block that are transmitted to the wireless communication device 12 on a downlink channel (e.g., Physical Downlink Shared Channel (PDSCH)). Alternatively or additionally, the downlink signal 14 transmitted by the radio network node 10 may include a control signal (or repetitions thereof) transmitted to wireless communication devices 12 over a control channel (e.g., an Enhanced Physical DL Control Channel (E-PDCCH, or Narrow Band E-PDCCH (NB-PDCCH)).

Uplink radio resources 17 may be frequency resources (e.g., sub-carriers), time resources (e.g., OFDM symbols or time slots), or combinations thereof (e.g., radio blocks in LTE).

In at least some embodiments, the radio network node 10 and wireless communication device 12 operate according to narrowband Internet of Things (NB-IoT) specifications. In this regard, embodiments described herein are explained in the context of operating in or in association with a RAN that communicates over radio communication channels with wireless communication devices, also interchangeably referred to as wireless terminals or user equipments (UEs), using a particular radio access technology. More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

A radio network node 10 herein is any type of network node (e.g., a base station) capable of communicating and/or configured to communicate with another node over radio signals. A wireless communication device 12 is any type device capable of communicating and/or configured to communicate with a radio network node 10 over radio signals. A wireless communication device 12 may therefore refer to a machine-to-machine (M2M) device, a machine-type communications (MTC) device, a NB-IoT device, etc. A wireless communication device may also be referred to as a user equipment, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be a UE.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Figure 7:
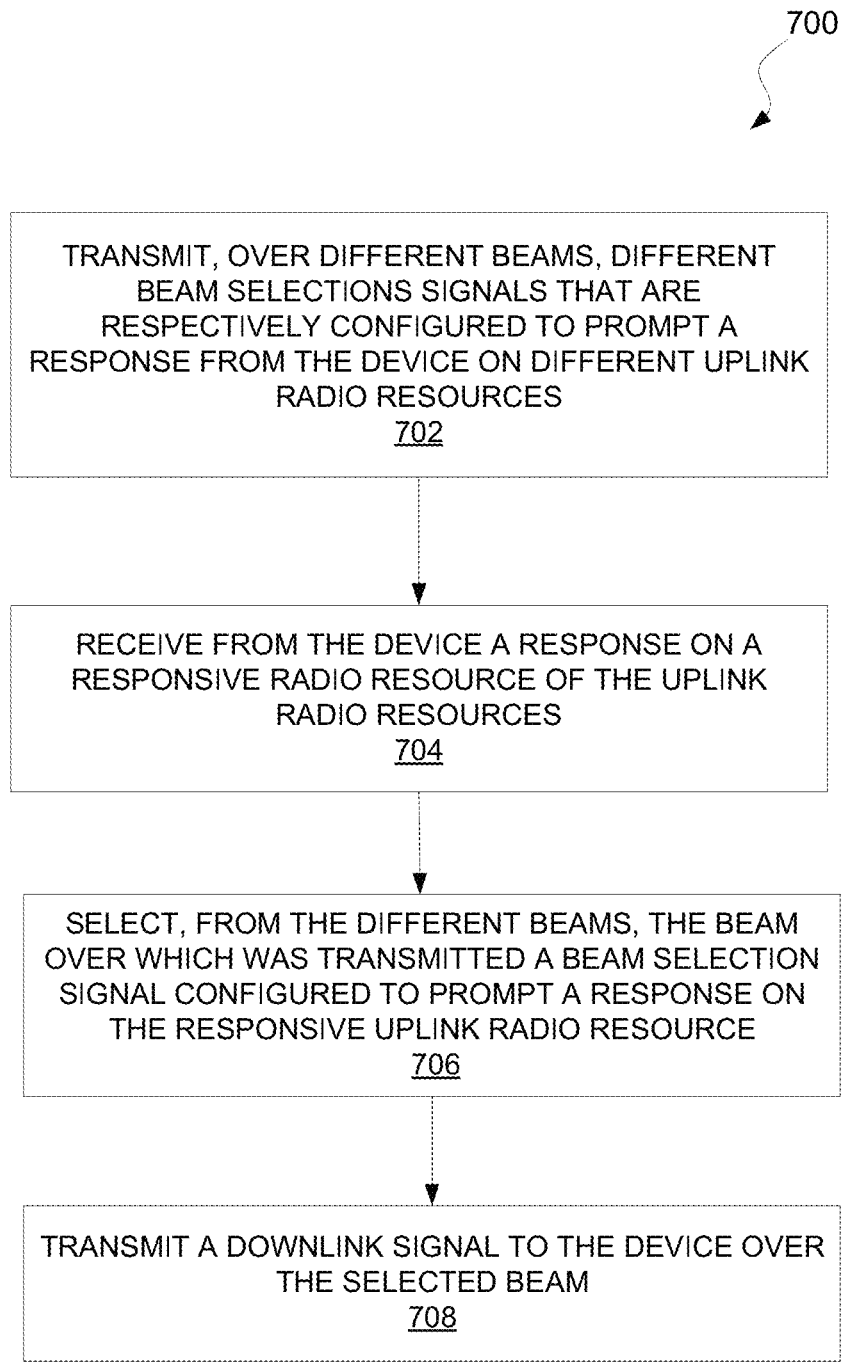
FIG. 7 is a logic flow diagram of a method implemented by a radio network node according to one or more embodiments.

In view of the modifications and variations described above, FIG. 7 presents a diagram containing aspect of an example method 700 for downlink signal transmission to a wireless communication device (e.g., a user equipment) over an adaptively selected beam, which may be implemented by a radio network node 10 in example embodiments of the present disclosure. As shown in FIG. 7, method 700 may include, at block 702, transmitting, over different beams, different beam selection signals that are respectively configured to prompt a response from a wireless communication device 12 (e.g., a user equipment) on different uplink radio resources. In an additional aspect, method 700 may include, at block 704, receiving, from the wireless communication device 12 (e.g., a user equipment), a response over a responsive radio resource of the uplink radio resources. Method 700 may also include, at block 706, selecting, from the different beams, a beam over which was transmitted a beam selection signal configured to prompt a response on the responsive uplink radio resource. Additionally. method 700 may include, at block 708, transmitting a downlink signal to the wireless communication device 12 (e.g., user equipment) over the selected beam.

Furthermore, although not shown in FIG. 7, method 700 may include further aspects, including but not limited to those disclosed in one or more of the enumerated embodiments below.

Note that the radio network node 10 as described above may perform the processing herein by implementing any functional means or units. In one embodiment, for example, the radio network node 10 comprises respective circuits configured to perform the steps shown in FIG. 7, below. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 8B:
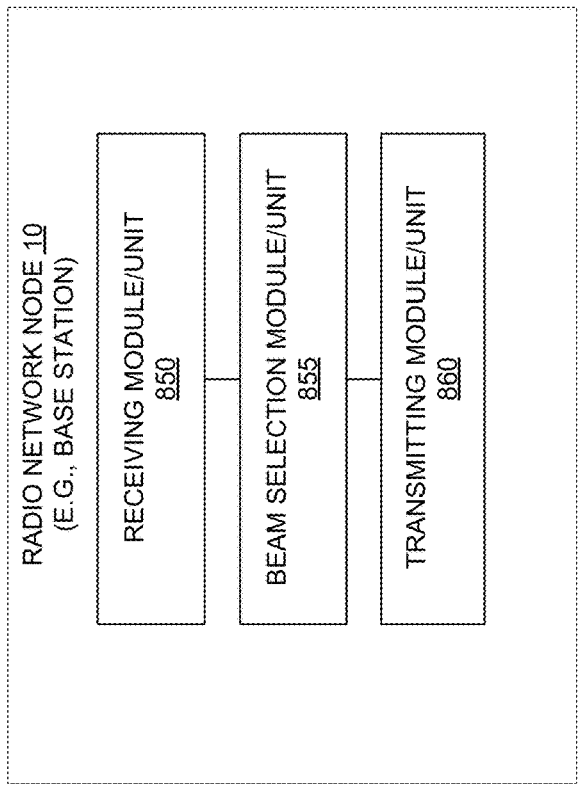
FIG. 8B is a block diagram of a radio network node according to one or more other embodiments.
Figure 8A:
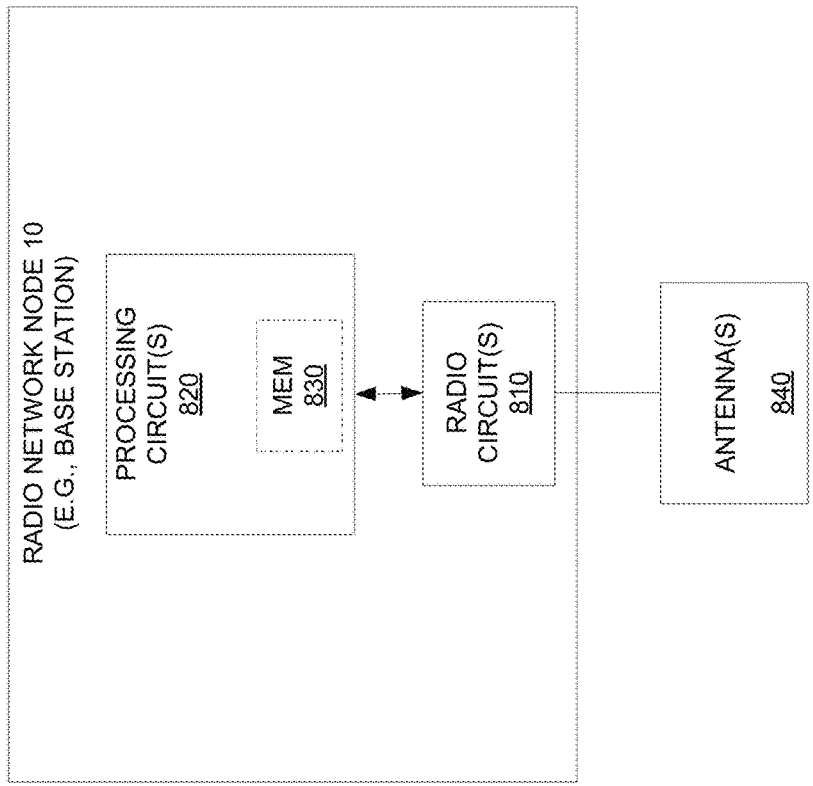
FIG. 8A is a block diagram of a radio network node according to one or more embodiments.

FIG. 8A for example illustrates additional details of a radio network node 10 in accordance with one or more embodiments. As shown, the radio network node 10 includes one or more processing circuits 820 and one or more radio circuits 810. The one or more radio circuits 810 are configured to transmit via one or more antennas 840. The one or more processing circuits 820 are configured to perform processing described above, e.g., in FIGS. 1-7, such as by executing instructions stored in memory 830. The one or more processing circuits 820 in this regard may implement certain functional means or units.

FIG. 8B for example shows that the radio network node 10 comprises certain functional means or units according to some embodiments. In particular, the radio network node 10 may implement receiving module/unit 850 for receiving one or more responses from wireless communication devices over responsive radio resources, a beam selection module or unit 855 for implementing beam selection techniques as described above, and a transmitting module or unit 860 for transmitting beam selection signals 15 and/or downlink signals 14, e.g., via the one or more radio circuits 810.

Figure 8C:
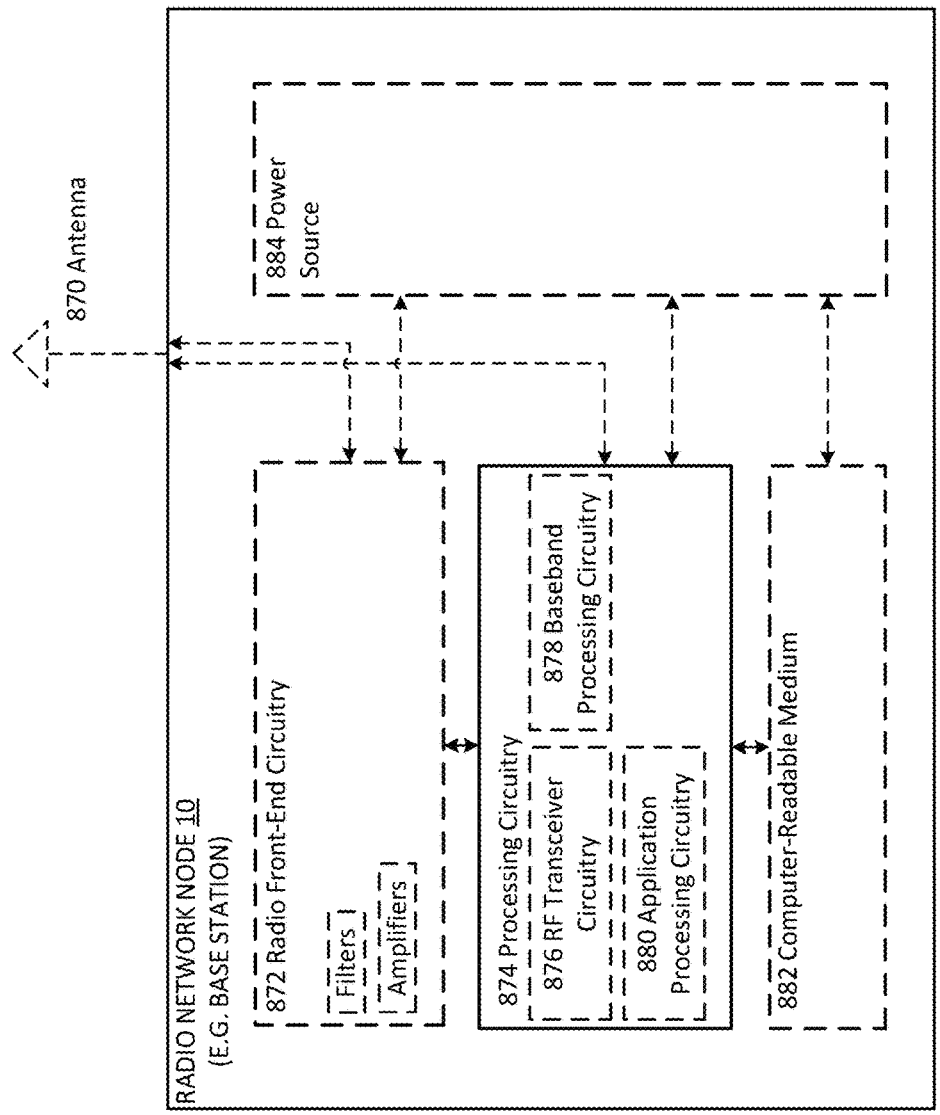
FIG. 8C is a block diagram of a radio network node according to one or more other embodiments.

Additional details of the radio network node 10 are shown in relation to FIG. 8C. As shown in FIG. 8C, the example radio network node 10 includes an antenna 870, radio circuitry (e.g. radio front-end circuitry) 872, processing circuitry 874, and the radio network node 10 may also include a memory 882. The memory 882 may be separate from the processing circuitry 874 or an integral part of processing circuitry 874. Antenna 870 may include one or more antennas or antenna arrays, and is configured to send and/or receive wireless signals, and is connected to radio circuitry (e.g. radio front-end circuitry) 872. In certain alternative embodiments, radio network node 10 may not include antenna 870, and antenna 870 may instead be separate from radio network node 10 and be connectable to radio network node 10 through an interface or port.

The radio circuitry (e.g. radio front-end circuitry) 872 may comprise various filters and amplifiers, is connected to antenna 870 and processing circuitry 874, and is configured to condition signals communicated between antenna 870 and processing circuitry 874. In certain alternative embodiments, radio network node 10 may not include radio circuitry (e.g. radio front-end circuitry) 872, and processing circuitry 874 may instead be connected to antenna 870 without front-end circuitry 872.

Processing circuitry 874 may include one or more of radio frequency (RF) transceiver circuitry, baseband processing circuitry, and application processing circuitry. In some embodiments, the RF transceiver circuitry 876, baseband processing circuitry 878, and application processing circuitry 880 may be on separate chipsets. In alternative embodiments, part or all of the baseband processing circuitry 878 and application processing circuitry 880 may be combined into one chipset, and the RF transceiver circuitry 876 may be on a separate chipset. In still alternative embodiments, part or all of the RF transceiver circuitry 876 and baseband processing circuitry 878 may be on the same chipset, and the application processing circuitry 880 may be on a separate chipset. In yet other alternative embodiments, part or all of the RF transceiver circuitry 876, baseband processing circuitry 878, and application processing circuitry 880 may be combined in the same chipset. Processing circuitry 874 may include, for example, one or more central processing units (CPUs), one or more microprocessors, one or more application specific integrated circuits (ASICs), and/or one or more field programmable gate arrays (FPGAs).

The radio network node 1 may include a power source 884. The power source 884 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 872, processing circuitry 874, and/or memory 882. The power source 884, battery, power supply circuitry, and/or power management circuitry are configured to supply radio network node 10, including processing circuitry 874, with power for performing the functionality described herein.

Though not explicitly described above, the present disclosure envisions further example embodiments that may be related to aspects of the above-described embodiments. As such, the above-described embodiments are not limiting. What is more, additional or alternative embodiments associated with or performed by the wireless communication device 12 and/or radio network node 10 may be utilized in some implementations.

Figure 9:
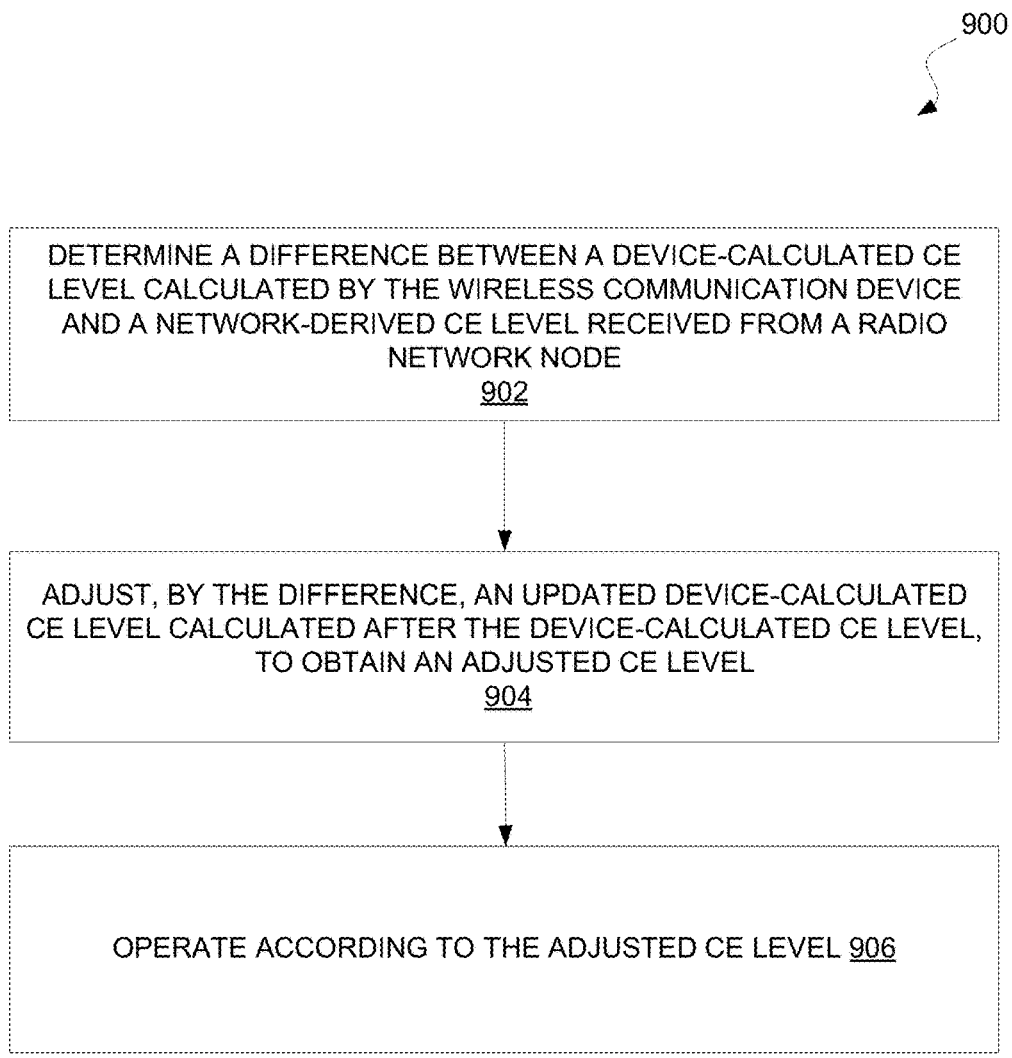
FIG. 9 is a logic flow diagram of a method implemented by a wireless communication device according to one or more embodiments.

For instance, FIG. 9 presents a diagram containing aspects of an example method 900 for adjusting a coverage enhancement (CE) level according to which a wireless communication device (e.g., a user equipment) operates in a wireless communication system. In some examples, coverage enhancement may be utilized to improve wireless communication between a radio network node 10 and one or more wireless communication devices 12, and may involve repetition of transmissions of a data block over a channel in the time and/or frequency domain, power boosting for transmissions over an uplink or downlink channel or subcarrier, channel subcarrier selection, and/or any other technique for improving communication quality between the devices. In some examples, such as those that may be implemented in a NB-IoT wireless communication system, each wireless communication device 12 in the wireless communication system may have an associated CE level, which may be a factor in determining a number of transmission repetitions that are to be conducted for uplink transmissions from (or downlink communications to) the wireless communication device. In some examples, the CE level may correspond to number or range of repetitions, a value (or value range) for a desired or realized gain of one or more transmitted or received signals, a transmission power or transmission power range associated with a device, or any other parameter that may be altered to tune communications to a particular quality level or range.

In one or more embodiments, the wireless communication device 12 itself calculates a CE level according to which it operates. Under some circumstances, however this device-calculated CE level may not reflect or otherwise characterize the true or optimal CE level according to which the device 12 is able to operate. For example, in some embodiments, the device 12 determines the device-calculated CE level based on measuring one or more non-beamformed pilot or beacon signals (e.g., cell-specific reference signals, CRS, in LTE) received from a radio network node. This means that the device-calculated CE level does not account for any additional coverage enhancement that may be attributable to beamforming by the radio network node, e.g., especially where that beamforming remains transparent to the device 12.

In these and other embodiments, the radio network node (or another network-side device) may also compute or otherwise derive a CE level associated with the wireless communication device 12, e.g., independent of the self-CE-calculation performed by the wireless communication device 12. In this case, the network may transmit the network-derived CE level to the wireless communication device 12,. The wireless communication device 12 according to some embodiments herein preferentially operates according to the network-derived CE level, rather than the device-calculated CE level, e.g., because the network-derived CE level accounts for beamforming transparent to the device-calculated CE level.

Note, though, that the network may transmit updated network-derived CE levels to the device 14 only occasionally or periodically at certain time intervals, especially in narrowband systems with scarce radio resources. If radio conditions change between reception of network-derived CE level updates, operating according to the last received network-derived CE level may prove sub-optimal.

As such, in an embodiment, the wireless communication device 12 may determine a difference between a network-derived CE level received from the radio network node and a device-calculated CE level (e.g., calculated upon or most recently before receiving the network-derived CE level). This difference may in a sense account for any beamforming gain attributable to beamforming applied by the radio network node but that is transparent to the device-calculated CE level. In any event, the device 12 may subsequently update its CE level calculation, to obtain an updated device-calculated CE level. Notably, the wireless communication device 12 adjusts this updated device-calculated CE level by the determined difference.

Particular aspects of such a technique that may be implemented by a wireless communication device 12 are presented in example method 900. As shown in FIG. 9, method 900 may include, at block 902, determining a difference between a device-calculated CE level calculated by the wireless communication device 12 and a network-derived CE level received from a radio network node. In some examples, the device-calculated CE level and any updated CE level calculated by the wireless communication device 12 may be calculated based on measuring one or more radio signals that are not beamformed by the radio network node, such as beacon signals, pilot signals, or any signal that may be broadcasted by the radio network node without the use of beamforming techniques.

In addition, method 900 may include, at block 904, adjusting, by the difference, an updated device-calculated CE level calculated after the device-calculated CE level, to obtain an adjusted CE level. Method 900 may also include operating according to the adjusted CE level at block 906.

In one or more embodiments, the updated device-calculated CE level reflects the CE level characterized by current (i.e., updated) radio conditions, without accounting for beamforming. But that updated CE level is adjusted to account for the differential effect of beamforming on the CE level, e.g., based on the assumption that the differential beamforming effect has remained substantially static since receiving the network-derived CE level. In at least some embodiments, the device 12 is configured to selectively adjust its calculated CE level only under certain conditions, e.g., that suggest the differential beamforming effect has remained substantially static.

In one or more embodiments, for example, the device 12 may receive the network-derived CE level when the device 12 is in a certain geographical area or cell. In this case, the device 12 may adjust any updated device-calculated CE level by the difference, until the wireless communication device moves from that certain geographical area or cell. For example, the device 12 may adjust CE level calculations by the determined device while the device 12 remains substantially stationary. If such movement is determined, though, the adjusted CE level may no longer be beneficial due to altered radio conditions caused by the movement or relatively limited capabilities of a radio network node associated with the new cell.

In some embodiments, the radio network node 10 may exploit the stationary nature of a device 12 in order to reduce control signaling overhead. For example, the radio network node 10 may halt transmission of updated network-derived CE levels, e.g., based on the assumption that such updates are marginal or unnecessary given the stationary nature of the device 12.

In other embodiments, though, the radio network node 10 may still occasionally or periodically transmit updates of its network-derived CE level to the device 12. In this case, the device 12 may adjust any updated device-calculated CE level by its last determined difference, until an updated network-derived CE level or a contrary instruction is received from the radio network node. Once an updated network-derived CE level is received, for example, the device 12 may update its difference calculation and perform subsequent adjustments based on the updated difference.

Additionally, note that the wireless communication device 12 (e.g., user equipment) as described above may perform the processing herein by implementing any functional means or units. In one embodiment, for example, the wireless communication device 12 comprises respective circuits configured to perform the steps shown in FIG. 9. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 10B:
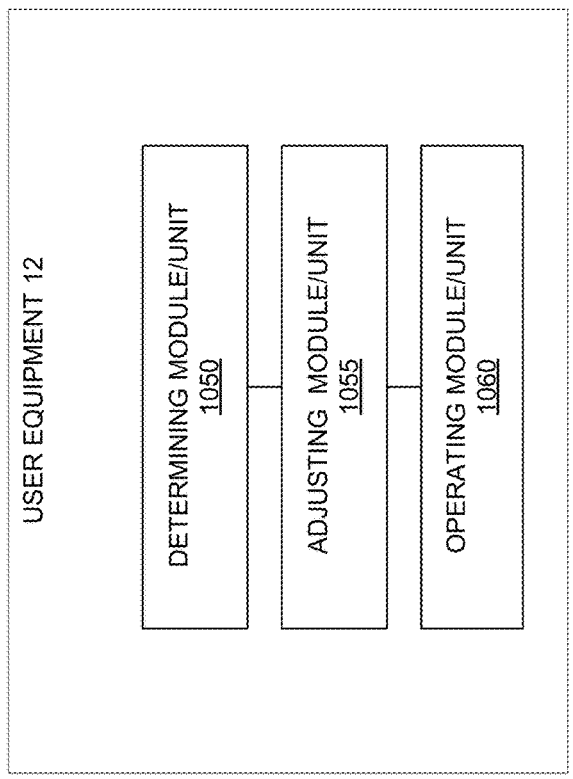
FIG. 10B is a block diagram of a wireless communication device according to one or more other embodiments.
Figure 10A:
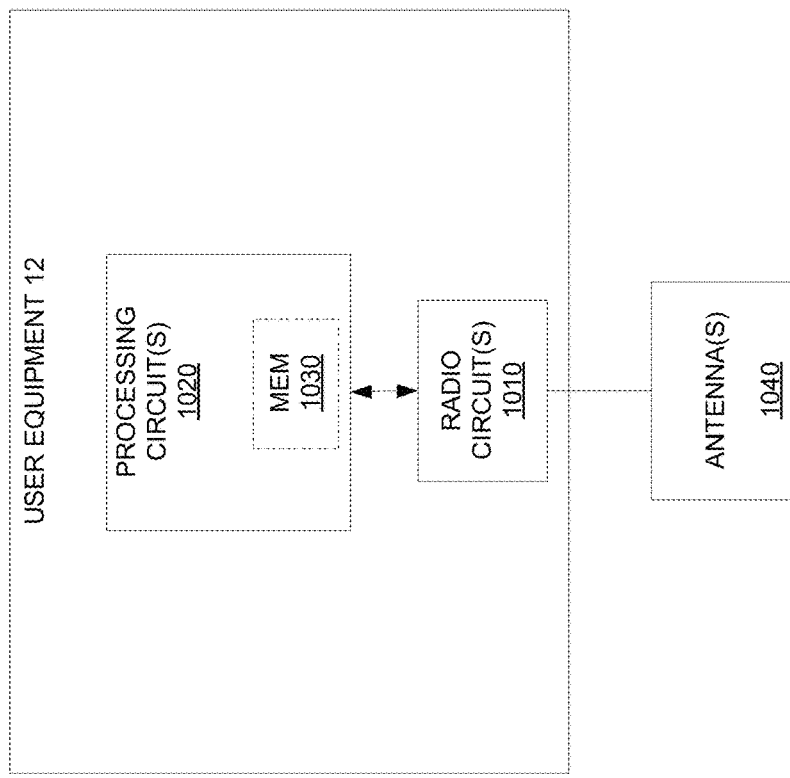
FIG. 10A is a block diagram of a wireless communication device according to one or more embodiments.

FIG. 10A for example illustrates additional details of a user equipment 12 in accordance with one or more embodiments. As shown, the user equipment 12 includes one or more processing circuits 1020 and one or more radio circuits 1010. The one or more radio circuits 1010 are configured to transmit via one or more antennas 1040. The one or more processing circuits 1020 are configured to perform processing described above, e.g., implementing the steps of FIG. 9, such as by executing instructions stored in memory 1030. The one or more processing circuits 1020 in this regard may implement certain functional means or units.

FIG. 10B in this regard illustrates a user equipment 12 according to some embodiments that includes certain functional means or units. As shown, the user equipment 12 includes a determining module 1050 for determining a difference between a device-calculated CE level calculated by the user equipment 12 and a network-derived CE level received from a radio network node. The user equipment 12 may also implement an adjusting module 1055 for adjusting, by the difference, an updated device-calculated CE level calculated after the device-calculated CE level, to obtain an adjusted CE level. And the user equipment 12 may further implement an operating module 1060 for operating the user equipment 12 according to the adjusted CE level. Although not shown, the user equipment 12 may also implement a receiving module or unit for receiving a CE level calculated by a radio network node, e.g., via the one or more radio circuits 1010, and/or a transmitting module/unit for transmitting one or more signals to other devices.

Figure 10C:
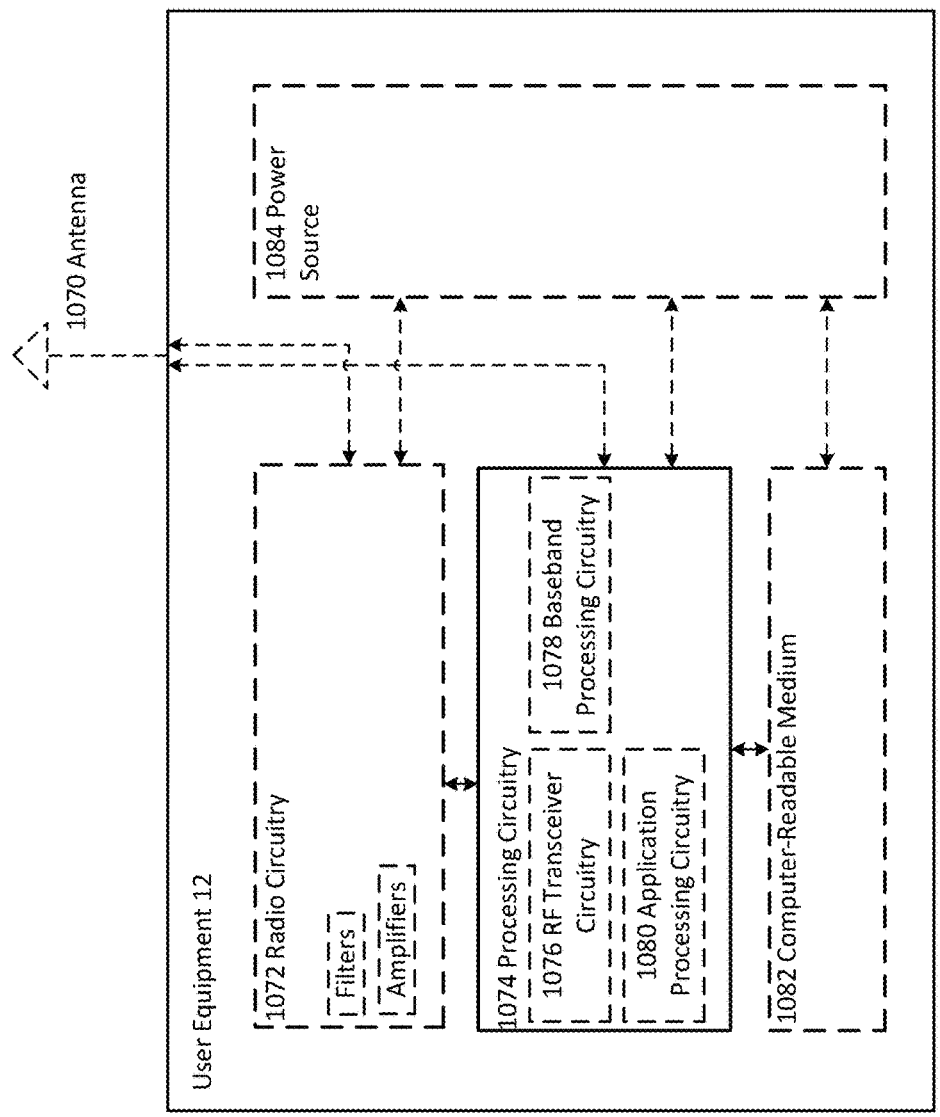
FIG. 10C is a block diagram of a wireless communication device according to one or more other embodiments.

Additional details of a user equipment 12 according to some embodiments are shown in relation to FIG. 10C. As shown in 10C, the example user equipment 12 includes an antenna 1070, radio circuitry (e.g. radio front-end circuitry) 1072, processing circuitry 1074, and the user equipment 12 may also include a memory 1082. The memory 1082 may be separate from the processing circuitry 1074 or an integral part of processing circuitry 1074. Antenna 1070 may include one or more antennas or antenna arrays, and is configured to send and/or receive wireless signals, and is connected to radio circuitry (e.g. radio front-end circuitry) 1072. In certain alternative embodiments, user equipment 12 may not include antenna 1070, and antenna 1070 may instead be separate from user equipment 12 and be connectable to user equipment 12 through an interface or port.

The radio circuitry (e.g. radio front-end circuitry) 1072 may comprise various filters and amplifiers, is connected to antenna 1070 and processing circuitry 1074, and is configured to condition signals communicated between antenna 1070 and processing circuitry 1074. In certain alternative embodiments, user equipment 12 may not include radio circuitry (e.g. radio front-end circuitry) 1072, and processing circuitry 1074 may instead be connected to antenna 1070 without front-end circuitry 1072.

Processing circuitry 1074 may include one or more of radio frequency (RF) transceiver circuitry 1076, baseband processing circuitry 1078, and application processing circuitry 1080. In some embodiments, the RF transceiver circuitry 1076, baseband processing circuitry 1078, and application processing circuitry 1080 may be on separate chipsets. In alternative embodiments, part or all of the baseband processing circuitry 1078 and application processing circuitry 1080 may be combined into one chipset, and the RF transceiver circuitry 1076 may be on a separate chipset. In still alternative embodiments, part or all of the RF transceiver circuitry 1076 and baseband processing circuitry 1078 may be on the same chipset, and the application processing circuitry 1080 may be on a separate chipset. In yet other alternative embodiments, part or all of the RF transceiver circuitry 1076, baseband processing circuitry 1078, and application processing circuitry 1080 may be combined in the same chipset. Processing circuitry 1074 may include, for example, one or more central processing units (CPUs), one or more microprocessors, one or more application specific integrated circuits (ASICs), and/or one or more field programmable gate arrays (FPGAs).

The user equipment 12 may include a power source 1084. The power source 1084 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1072, processing circuitry 1074, and/or memory 1082. The power source 1084, battery, power supply circuitry, and/or power management circuitry are configured to supply user equipment 12, including processing circuitry 1074, with power for performing the functionality described herein.

Additionally, although not explicitly shown in the figures, an example radio network node 10 of the present disclosure may be configured to perform functions related to CE level calculation and adjustment, such as those presented above in reference to FIG. 9 and method 900. For instance, the radio network node 10 may be configured to calculate, or obtain from another network device, a CE level associated with a wireless communication device 12 and may transmit the CE level to the wireless communication device 12. In an aspect, this calculating/obtaining and transmission may be performed periodically according to a CE level schedule, which may be static or dynamic and may be preconfigured or may be obtained from another network device or updated after the radio network node 10 begins communicating in a wireless communication environment. In addition, the radio network node 10 may be configured to transmit commands to the wireless communication device 12, which may include explicit commands to utilize or update a particular CE level according to which a wireless communication device 12 is operating. Furthermore, the radio network node 10 may be configured to determine whether a wireless communication device 12 is stationary, moving, or has moved to a different geographical region and adjust or halt CE level calculations based on one or more of these determinations.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a user equipment for adjusting a coverage enhancement (CE) level according to which the user equipment operates in a wireless communication system, the method comprising:
   determining a difference between a device-calculated CE level calculated by the user equipment and a network-derived CE level received from a radio network node;
   updating the device-calculated CE level based on one or more current radio conditions without consideration of beamforming;
   adjusting, by the difference, the updated device-calculated CE level, to obtain an adjusted CE level; and
   operating according to the adjusted CE level.

2. The method of claim 1, the updated device-calculated CE level is adjusted by the difference, until an updated network-derived CE level or a contrary instruction is received from the radio network node.

3. The method of claim 1, further comprising receiving the network-derived CE level when the user equipment is in a certain geographical area or cell, wherein the updated device-calculated CE level is adjusted by the difference, until the user equipment moves from the certain geographical area or cell.

4. The method of claim 1, wherein the device-calculated CE level and any updated device-calculated CE level is calculated based on measuring one or more radio signals that are not beamformed by the radio network node.

5. A user equipment for adjusting a coverage enhancement (CE) level according to which the user equipment operates in in a wireless communication system, the user equipment comprising:
   processing circuitry;
   memory containing instructions executable by the processing circuitry whereby the user equipment is operative to:
      determine a difference between a device-calculated CE level calculated by the user equipment and a network-derived CE level received from a radio network node;
      update the device-calculated CE level based on one or more current radio conditions without consideration of beamforming;
      adjust, by the difference, the updated device-calculated CE level, to obtain an adjusted CE level; and
      operate according to the adjusted CE level.

6. The user equipment of claim 5, wherein the updated device-calculated CE level is adjusted by the difference, until an updated network-derived CE level or a contrary instruction is received from the radio network node.

7. The user equipment of claim 5, wherein the user equipment is configured to:
   receive the network-derived CE level when the user equipment is in a certain geographical area or cell, wherein the updated device-calculated CE level is adjusted by the difference, until the user equipment moves from the certain geographical area or cell.

8. The user equipment of claim 5, wherein the device-calculated CE level and any updated device-calculated CE level is calculated based on measuring one or more radio signals that are not beamformed by the radio network node.

9. A non-transitory computer readable recording medium storing a computer program product for controlling a user equipment for adjusting a coverage enhancement (CE) level according to which the user equipment operates in a wireless communication system, the computer program product comprising software instructions which, when run on processing circuitry of the user equipment, causes the user equipment to:
   determine a difference between a device-calculated CE level calculated by the user equipment and a network-derived CE level received from a radio network node;
   update the device-calculated CE level based on one or more current radio conditions without consideration of beamforming;
   adjust, by the difference, the updated device-calculated CE level to obtain an adjusted CE level; and
   operate according to the adjusted CE level.

* * * * *